United States Patent
Yamaguchi et al.

(10) Patent No.: US 8,329,343 B2
(45) Date of Patent: Dec. 11, 2012

(54) BATTERY AND ELECTRODE

(75) Inventors: Hiroyuki Yamaguchi, Fukushima (JP);
Toru Odani, Fukushima (JP); Masayuki Ihara, Fukushmia (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 12/534,991

(22) Filed: Aug. 4, 2009

(65) Prior Publication Data
US 2010/0035161 A1 Feb. 11, 2010

(30) Foreign Application Priority Data
Aug. 5, 2008 (JP) ................ 2008-202172

(51) Int. Cl.
*H01M 4/72* (2006.01)

(52) U.S. Cl. ............ 429/234; 429/218.1; 429/221; 429/223; 429/229; 429/220; 429/199; 429/332; 429/330; 429/338; 429/343

(58) Field of Classification Search ........... 429/234, 429/218.1, 221, 223, 229, 220, 199, 332, 429/330, 338, 343
See application file for complete search history.

(56) References Cited

U.S. PATENT DOCUMENTS

| | | | |
|---|---|---|---|
| 5,654,114 A | 8/1997 | Kubota et al. | |
| 5,660,951 A | 8/1997 | Yoshida | |
| 6,228,532 B1 | 5/2001 | Tsuji et al. | |
| 6,232,020 B1 | 5/2001 | Song et al. | |
| 6,340,539 B1 | 1/2002 | Yamaguchi et al. | |
| 6,548,212 B1 | 4/2003 | Heider et al. | |
| 6,589,698 B1 | 7/2003 | Noh et al. | |
| 6,942,948 B2 | 9/2005 | Takehara et al. | |
| 7,229,717 B2 | 6/2007 | Yamaguchi et al. | |
| 2004/0058232 A1 | 3/2004 | Kim et al. | |
| 2005/0003277 A1 | 1/2005 | Lee et al. | |
| 2005/0095504 A1 | 5/2005 | Kim et al. | |
| 2005/0221197 A1 | 10/2005 | Yew et al. | |
| 2006/0127777 A1 | 6/2006 | Ihara et al. | |
| 2007/0281217 A1 | 12/2007 | Ihara et al. | |
| 2008/0085454 A1 | 4/2008 | Ihara et al. | |

FOREIGN PATENT DOCUMENTS

| | | |
|---|---|---|
| JP | 06-060906 | 3/1994 |
| JP | 07-263028 | 10/1995 |
| JP | 83419119 | 5/1996 |
| JP | 8162370 | 6/1996 |
| JP | 982311 | 3/1997 |
| JP | 982330 | 3/1997 |
| JP | 10-255800 | 9/1998 |
| JP | 2000-067852 | 3/2000 |
| JP | 2000-082468 | 3/2000 |
| JP | 2002-268863 | 9/2000 |
| JP | 2000-340259 | 12/2000 |
| JP | 2001-135351 | 5/2001 |
| JP | 2002-56891 | 2/2002 |
| JP | 2004-119372 | 4/2004 |
| JP | 2005-26230 | 1/2005 |
| JP | 2005-142156 | 6/2005 |
| JP | 2005-166469 | 6/2005 |
| JP | 2005-332606 | 12/2005 |
| JP | 4051686 | 4/2006 |
| JP | 2006-294519 | 10/2006 |
| JP | 2007-324103 | 12/2007 |
| JP | 2008-016445 | 1/2008 |
| JP | 2008-308421 | 12/2008 |
| JP | 2009-129893 | 6/2009 |

OTHER PUBLICATIONS

Japanese Office Action issued Dec. 14, 2010, for corresponding Japanese Appln. No. 2008-202172.

*Primary Examiner* — Laura Weiner
(74) *Attorney, Agent, or Firm* — K&L Gates LLP

(57) ABSTRACT

An electrode includes: an electrode collector and an electrode active material layer, wherein a film containing a salt represented by the following formula (I) is provided on the electrode active material layer:

$$R1A_nM_x \qquad (I)$$

wherein R1 represents an n-valent organic group containing a sulfur atom; n represents an integer of from 1 to 4; A represents an anion; M represents a metal ion; and x represents an integer of 1 or more.

9 Claims, 6 Drawing Sheets

BATTERY AND ELECTRODE

CROSS REFERENCES TO RELATED APPLICATIONS

The present application claims priority to that disclosed in Japanese Priority Patent Application JP 2008-202172 filed in the Japan Patent Office on Aug. 5, 2008, the entire contents of which is hereby incorporated by reference.

BACKGROUND

The present application relates to an electrode having a film on an electrode active material layer and a battery provided with a positive electrode thereof.

In recent years, portable electronic appliances such as a camera-integrated VTR (video tape recorder), a mobile phone and a laptop personal computer have widely diffused, and it is strongly demanded to reduce their size and weight and to achieve their long life. Following this, batteries, in particular, light-weight secondary batteries capable of providing a high energy density have been developed as a power source.

Above all, a secondary battery utilizing intercalation and deintercalation of lithium (Li) for a charge and discharge reaction (so-called "lithium ion secondary battery") is greatly expected because it is able to provide a higher energy density than a lead battery or a nickel-cadmium battery. Such a lithium ion secondary battery is provided with an electrolytic solution as well as a positive electrode and a negative electrode, and the negative electrode has a negative electrode active material layer on a negative electrode collector.

A carbon material such as graphite is widely used as a negative electrode active material to be contained in the negative electrode active material layer. Also, in recent years, following the development of a high performance and a multi-function of portable electronic appliances, a more enhancement of the battery capacity is demanded. Thus, it is investigated to use silicon, tin or the like instead of the carbon material. This is because a theoretical capacity of silicon (4,199 mAh/g) and a theoretical capacity of tin (994 mAh/g) are significantly higher than a theoretical capacity of graphite (372 mAh/g), and therefore, a large enhancement of the battery capacity can be expected.

However, in the lithium ion secondary battery, the negative electrode active material having lithium intercalated therein becomes highly active at the time of charge and discharge, and therefore, not only the electrolytic solution is easily decomposed, but lithium is easily deactivated. Thus, a sufficient cycle characteristic is hardly obtained. In the case of using, as a negative electrode active material, silicon with a high theoretical capacity or the like, this problem becomes conspicuous. There is also involved a problem that when the cycle proceeds, a decomposition product of the electrolytic solution is deposited on the electrode, whereby the resistance increases.

Then, in order to solve various problems of the lithium ion secondary battery, there have been made a number of investigations. Specifically, in order to enhance a negative electrode characteristic and a low-temperature characteristic, there is proposed a technology for incorporating a phenylsulfonic acid metal salt into an electrolytic solution (see, for example, JP-A-2002-056891). Also, there is proposed a technology for incorporating an organic alkali metal salt into an electrolytic solution (see, for example, JP-A-2000-268863). Furthermore, in order to enhance a storage characteristic and a cycle characteristic, there is proposed a technology for incorporating a hydroxycarboxylic acid into an electrolytic solution (see, for example, JP-A-2003-092137). In addition to this, in order to suppress a lowering of the battery capacity, there is proposed a technology for coating a carbon material which is a negative electrode active material with a lithium alkoxide compound (see, for example, JP-A-08-138745). Also, in order to increase adhesion of an electrode, there is proposed a technology for adding a mercapto group or a sulfide (see, for example, JP-A-09-82311 and JP-A-09-82330).

SUMMARY

In recent years, in portable electronic appliances, a high performance and a multi-function are developed more and more, and there is a tendency that a consumed electric power thereof also increases. For those reasons, it is the present situation that charge and discharge of a secondary battery are repeated so that its cycle characteristic is easily lowered. Also, on that occasion, it is the present situation that a decomposition product of an electrolytic solution is deposited on an electrode, and therefore, the battery resistance is easy to increase. From these facts, much more enhancements in a cycle characteristic of the secondary battery and suppression of the battery resistance are desired.

Thus, it is desirable to provide an electrode capable of suppressing the battery resistance without lowering a cycle characteristic and a battery.

[1] According to an embodiment, there is provided an electrode including an electrode collector and an electrode active material layer, wherein a film containing a salt represented by the following formula (I) is provided on the electrode active material layer.

$$R1A_nM_x \qquad (I)$$

In the formula (I), R1 represents an n-valent organic group containing a sulfur atom; n represents an integer of from 1 to 4; A represents an anion; M represents a metal ion; and x represents an integer of 1 or more.

[2] According to another embodiment, there is provided a battery including: a positive electrode having a positive electrode collector and a positive electrode active material layer; a negative electrode having a negative electrode collector and a negative electrode active material layer; and an electrolytic solution, wherein a film is provided on at least one of the positive electrode active material layer and the negative electrode active material layer, the film containing a salt represented by the following formula (I).

$$R1A_nM_x \qquad (I)$$

In the formula (I), R1 represents an n-valent organic group containing a sulfur atom; n represents an integer of from 1 to 4; A represents an anion; M represents a metal ion; and x represents an integer of 1 or more.

In the electrode according to the embodiment, since the film containing the compound represented by the formula (I) is provided on the electrode active material layer, chemical stability of the electrode is enhanced as compared with the case where the subject film is not provided. For that reason, in the case where the electrode is used for electrochemical devices such as batteries, not only the electrode reactant is intercalated and deintercalated with efficiency in the electrode, but the electrode hardly reacts with other materials such as the electrolytic solution. According to this, in the electrode and the battery according to the embodiments, an increase of the reaction resistance can be suppressed without lowering the cycle characteristic. In that case, since the film is provided by using a solution containing the compound represented by the formula (I), a good film can be simply provided as compared with the case of using a method requiring a special environmental condition such as an environment under reduced pressure.

Additional features and advantages are described herein, and will be apparent from the following Detailed Description and the figures.

DETAILED DESCRIPTION

Figure 1:
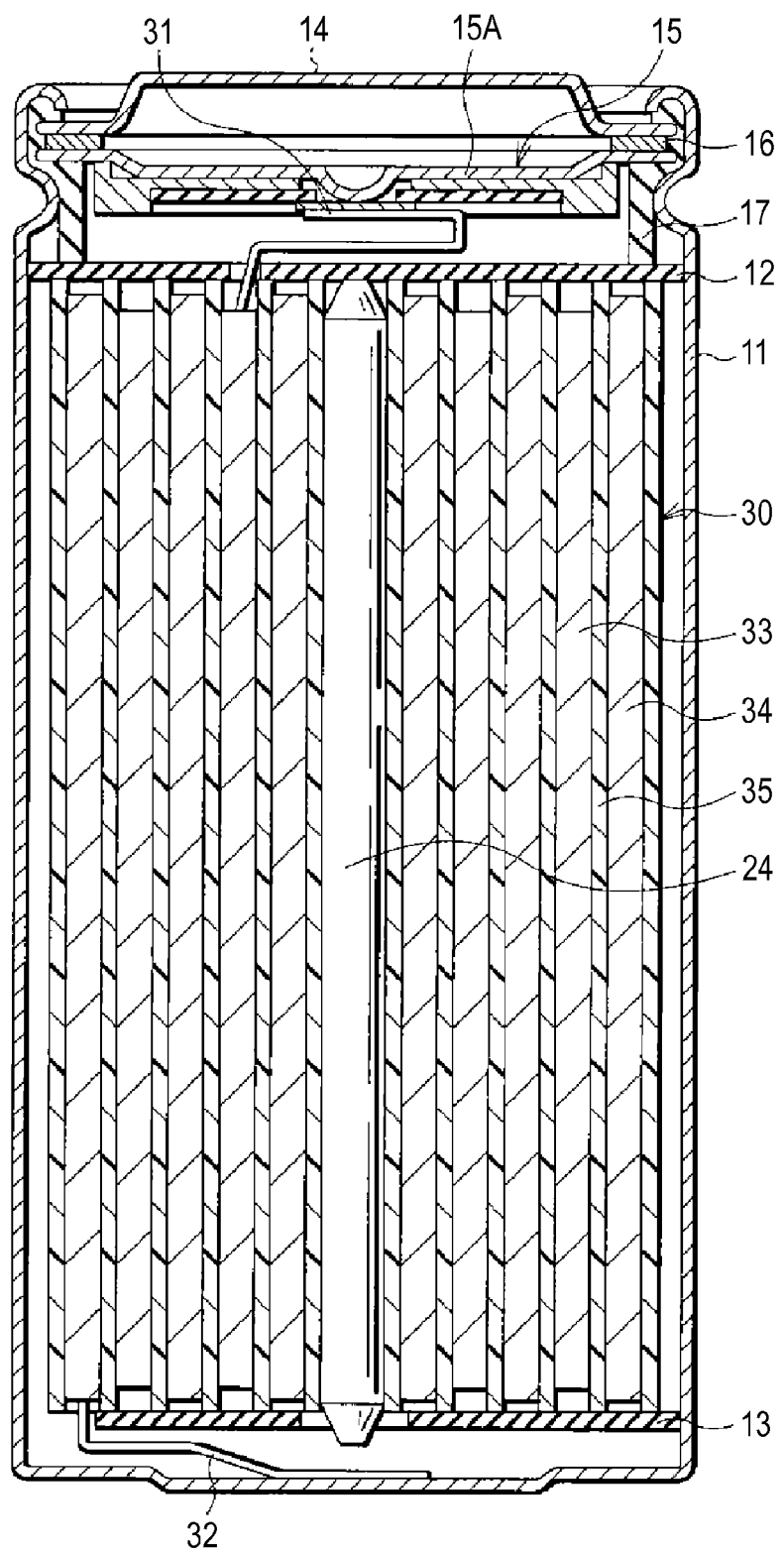
FIG. 1 is a sectional view showing a configuration of a first battery according to an embodiment.

The present application is described in detail with reference to the accompanying drawings according to an embodiment.

The electrode according to the embodiment has an electrode collector and an electrode active material layer and also has a film containing a salt represented by the following formula (I) (hereinafter also referred to as "compound (I)") on the electrode active material layer.

$$R1A_nM_x \qquad (I)$$

In the formula (I), R1 represents an n-valent organic group containing a sulfur atom; n represents an integer of from 1 to 4; A represents an anion; M represents a metal ion; and x represents an integer of 1 or more.

In the compound (I), in view of the fact that R1 contains a sulfur atom, when used as a film of an electrode of an electrochemical device, the compound itself is decomposed, whereby the chemical stability is enhanced. In addition, since the compound is low in solubility in an electrolytic solution, it remains on the electrode without being dissolved in the electrolytic solution, whereby an effect for enhancing the chemical stability can be continued. More specifically, in the case where this metal salt is used as an electrochemical device in a secondary battery, an increase in the reaction resistance of the electrode can be suppressed.

The compound (I) may have any structure as a whole so far as R1 presents an n-valent organic group containing a sulfur atom. Also, the anion A and the sulfur atom may be directly bonded to each other, or may be indirectly bonded to each other via some group. R1 is preferably an n-valent hydrocarbon group containing at least one structure selected from the group consisting of HS—, —S—, —S—S—, —S—C(=S)—S—, —N—C(=S)—S—, —C(=O)—S—, —O—C(=O)—S—, —S—C(=O)—S— and —S— (sulfur anion). R1 is preferably an n-valent hydrocarbon group at least one part of which is substituted by the group consisting of HS—, —S—, —S—S—, —S—C(=S)—S—, —N—C(=S)—S—, —C(=O)—S—, —O—C(=O)—S—, —S—C(=O)—S— and —S— (sulfur anion). Also, R1 preferably has from 1 to 10 carbon atoms.

In the compound (I), the anion represented by A is preferably $CO_2-$ or $S)_3$. The number of the anion in the compound (I) is from 1 to 4, and preferably from 1 to 2.

In the compound (I), the metal ion represented by M is preferably an alkali metal ion or an alkaline earth metal ion. Specific examples thereof include Li+, Na+, K+, $Mg^{2+}$ and $Ca^{2+}$. Of these, Li+, $Mg^{2+}$ and $Ca^{2+}$ are preferable from the viewpoint of solubility in the electrolytic solution. Also, the number x of the metal ion M in the compound (I) is 1 or more, and preferably from 1 to 10.

Specific examples of the compound (I) will be given below.

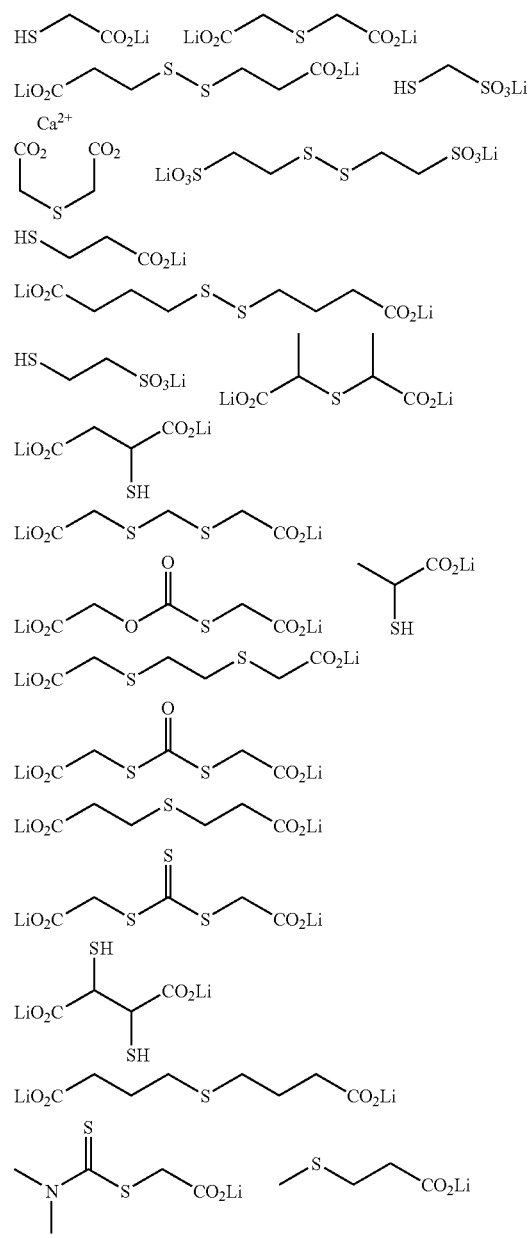

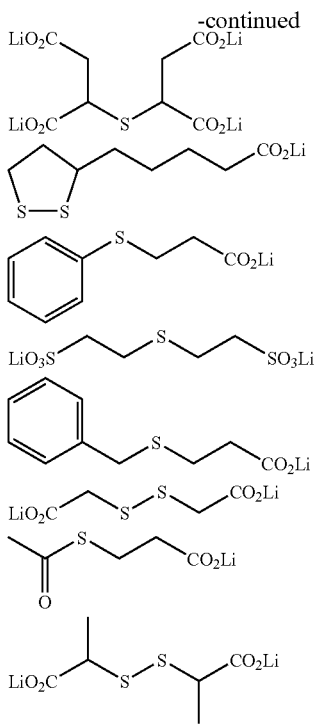

A content of the compound (I) is preferably from 0.01 to 20 % by mass, and more preferably from 0.0 1 to 10 % by mass relative to the active material.

Next, use examples of the foregoing compound (I) are described. When a secondary battery is given as an example of the electrochemical device, the compound (I) is used in the secondary battery as follows.

The secondary battery as described herein is a lithium ion secondary battery which is provided with a positive electrode and a negative electrode opposing to each other via a separator and in which, for example, a capacity of the negative electrode is expressed on the basis of intercalation and deintercalation of lithium which is an electrode reactant. The positive electrode has a positive electrode active material layer on a positive electrode collector, and the negative electrode has a negative electrode active material layer on a negative electrode collector. The electrolytic solution contains a solvent and an electrolyte salt dissolved therein.

In this secondary battery, at least one of the positive electrode and the negative electrode contains the foregoing compound (I). This is because the chemical stability of the electrode is enhanced by the compound (I), and therefore, a decomposition reaction of the electrolytic solution is suppressed.

Specifically, the film containing the compound (I) is provided on at least one of the positive electrode active material layer and the negative electrode active material layer.

The kind (battery structure) of this secondary battery is not particularly limited. With respect to the case where the negative electrode contains the compound (I), a detailed configuration of the secondary battery is hereunder described while referring to a cylinder type and a laminated film type as an example of the battery structure.

(First Secondary Battery)

FIG. 1 shows a sectional configuration of a first secondary battery.

This secondary battery is chiefly one in which a wound electrode body 30 having a positive electrode 33 and a negative electrode 34 wound therein via a separator 35 and a pair of insulating plates 12 and 13 are housed in the inside of a substantially hollow columnar battery can 11. The battery structure using this columnar battery can 11 is called a cylinder type.

For example, the battery can 11 has a hollow structure in which one end thereof is closed, with the other end being opened and is made of a metal material such as iron, aluminum and alloys thereof. In the case where the battery can 11 is made of iron, it may be plated with, for example, nickel, etc. The pair of the insulating plates 12 and 13 is disposed so as to vertically interpose the wound electrode body 30 therebetween and vertically extend relative to the wound peripheral surface thereof.

In the open end of the battery can 11, a battery lid 14 and a safety valve mechanism 15 and a positive temperature coefficient element (PTC element) 16 each provided on the inside of this battery lid 14 are installed by caulking via a gasket 17. According to this, the inside of the battery can 11 is hermetically sealed. The battery lid 14 is made of, for example, a material the same as that in the battery can 11. The safety valve mechanism 15 is electrically connected to the battery lid 14 via the positive temperature coefficient element 16. In this safety valve mechanism 15, in the case where the internal pressure reaches a fixed value or more due to an internal short circuit or heating from the outside or the like, a disc plate 15A is reversed, whereby electrical connection between the battery lid 14 and the wound electrode body 30 is disconnected. In view of the fact that the resistance increases corresponding to a rise of the temperature, the positive temperature coefficient element 16 controls the current, thereby preventing abnormal heat generation to be caused due to a large current. The gasket 17 is made of, for example, an insulating material, and asphalt is coated on the surface thereof.

A center pin 24 may be inserted in the center of the wound electrode body 30. In this wound electrode body 30, a positive electrode lead 31 made of a metal material such as aluminum is connected to the positive electrode 33; and a negative electrode lead 32 made of a metal material such as nickel is connected to the negative electrode 34. The positive electrode lead 31 is electrically connected to the battery lid 14 by means of welding to the safety valve mechanism 15 or other means; and the negative electrode lead 32 is electrically connected to the battery can 11 by means of welding or other means.

Figure 2:
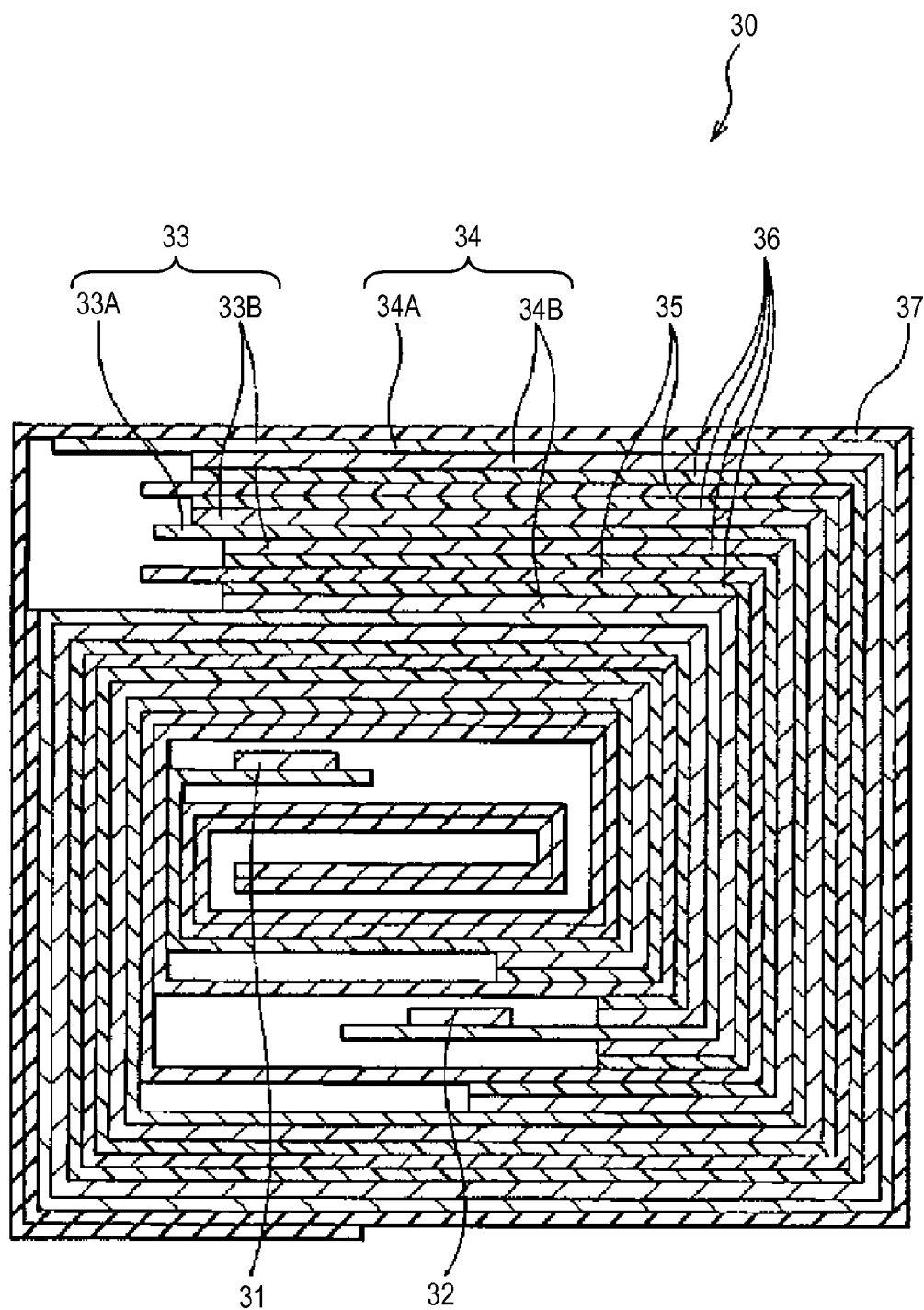
FIG. 2 is a sectional view showing enlargedly a part of a wound electrode body shown in FIG. 1.

FIG. 2 is a sectional view showing enlargedly a part of the wound electrode body 30 shown in FIG. 1.

The positive electrode 33 is, for example, one in which a positive electrode active material layer 33B is provided on the both surfaces of a positive electrode collector 33A having a pair of surfaces. However, the positive electrode active material layer 33B may be provided on only one surface of the positive electrode collector 33A.

The positive electrode collector 33A is made of a metal material, for example, aluminum, nickel, stainless steel, etc.

The positive electrode active material layer 33B contains, as a positive electrode active material, one or two or more kinds of a positive electrode material capable of intercalating and deintercalating lithium and may contain other materials such as a binder and a conductive agent as the need arises.

As the positive electrode material capable of intercalating and deintercalating lithium, for example, a lithium-containing compound is preferable. This is because a high energy density is obtained. Examples of this lithium-containing compound include complex oxides containing lithium and a transition metal element and phosphate compounds containing lithium and a transition metal element. Of these, compounds containing, as the transition metal element, at least one member selected from the group consisting of cobalt, nickel, manganese and iron are preferable. This is because a higher voltage is obtained. A chemical formula thereof is, for example, represented by $Li_xM1O_2$ or $Li_yM2PO_4$. In these formulae, M1 and M2 each represents at least one transition metal element. Values of x and y vary depending upon the state of charge and discharge and are usually satisfied with relations of $0.05 \leq x \leq 1.10$ and $0.05 \leq y \leq 1.10$, respectively.

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_x Ni_{(1-v-w)}Co_vMn_wO_2$ ((v+w)<1)) and a lithium manganese complex oxide having a spinel type structure ($LiMn_2O_4$). Of these, cobalt-containing complex oxides are preferable. This is because not only a high capacity is obtained, but an excellent cycle characteristic is obtained. Also, examples of the phosphate compound containing lithium and a transition metal element include a lithium iron phosphate compound ($LiFePO_4$) and a lithium iron manganese phosphate compound ($LiFe_{1-u}Mn_uPO_4$ (u<1)).

In addition to this, examples of the positive electrode material capable of intercalating and deintercalating lithium include oxides such as titanium oxide, vanadium oxide and manganese dioxide; disulfides such as titanium disulfide and molybdenum disulfide; chalcogenides such as niobium selenide; sulfur; and conductive polymers such as polyaniline and polythiophene.

As a matter of course, the positive electrode material capable of intercalating and deintercalating lithium may be a material other than those described above. Also, the foregoing series of positive electrode materials may be a mixture of two or more kinds thereof in an arbitrary combination.

The positive electrode active material is provided with the film of the compound (I). The reason why this film is provided on the positive electrode active material resides in the matter that the chemical stability of the positive electrode is enhanced, and following this, the chemical stability of the electrolytic solution adjacent to the positive electrode is also enhanced. According to this, not only lithium is efficiently intercalated and deintercalated in the positive electrode, but a decomposition reaction of the electrolytic solution is suppressed, whereby the cycle characteristic is enhanced.

This film may be provided so as to cover the entire surface of the positive electrode active material, or may be provided so as to cover a part of the surface thereof.

Examples of a method for providing the film include a liquid phase process such as a dipping process; and a vapor phase process such as a vapor deposition process, a sputtering process and a CVD (chemical vapor deposition) process. These processes may be adopted singly, or two or more processes may be adopted jointly. Of these, it is preferred to provide a film by using a solution containing the foregoing compound (I) as the liquid phase process. Specifically, for example, in the dipping process, the positive electrode active material is dipped in a solution containing the compound (I) and subsequently dried, thereby coating the compound (I) on the surface of the positive electrode active material. This is because a good film having high chemical stability can be easily provided. Examples of a solvent which dissolves the compound (I) therein include solvents with high polarity, such as water.

Examples of the conductive agent include carbon materials such as graphite, carbon black, acetylene black and ketjen black. These carbon materials may be used singly or in admixture of plural kinds thereof. The conductive agent may be a metal material or a conductive polymer so far as it is a material having conductivity.

Examples of the binder include synthetic rubbers such as styrene-butadiene based rubbers, fluorine based rubbers and ethylene-propylene-diene based rubbers; and polymer materials such as polyvinylidene fluoride. These binders may be used singly or in admixture of plural kinds thereof.

Figure 3:
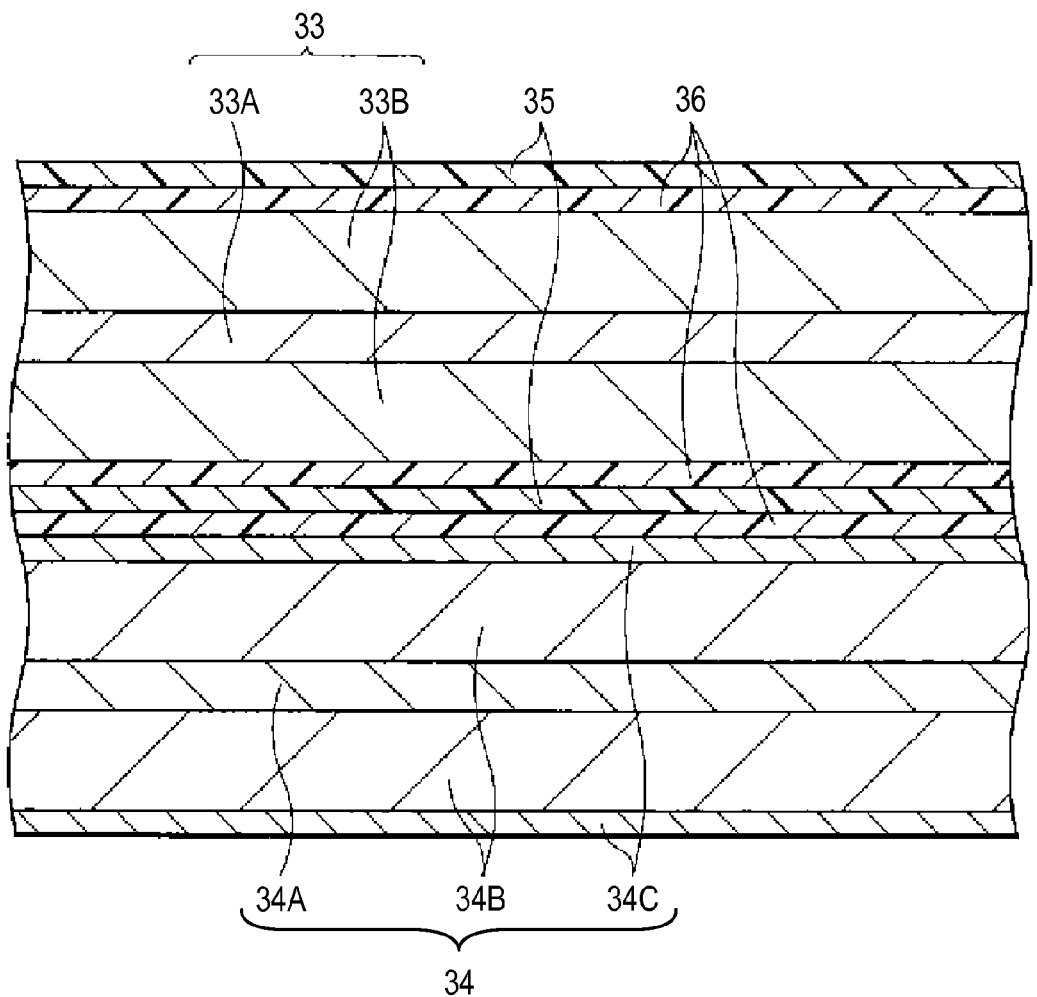
FIG. 3 is a sectional view showing enlargedly a part of a negative electrode shown in FIG. 1.

As shown in FIG. 3, the negative electrode 34 is, for example, one in which a negative electrode active material layer 34B and a film 34C are provided on the both surfaces of a negative electrode collector 34A having a pair of surfaces. However, the negative electrode active material layer 34B may be provided on only one surface of the negative electrode collector 34A. The same is also applicable with respect to the film 34C.

The negative electrode collector 34A is made of a metal material, for example, copper, nickel, stainless steel, etc. It is preferable that the surface of this negative electrode collector 34A is roughed. This is because adhesion between the negative electrode collector 34A and the negative electrode active material layer 34B is enhanced due to a so-called anchor effect. In that case, the surface of the negative electrode collector 34A may be roughed in at least a region opposing to the negative electrode active material layer 34B. Examples of a method for achieving roughing include a method for forming fine particles by an electrolysis treatment. The electrolysis treatment as referred to herein is a method in which fine particles are formed on the surface of the negative electrode collector 34A in an electrolysis vessel by means of electrolysis, thereby provides recesses and projections. A copper foil having this electrolysis treatment applied thereto is generally named as "electrolytic copper foil".

The negative electrode active material layer 34B contains, as a negative electrode active material, one or two or more kinds of a negative electrode material capable of intercalating and deintercalating lithium and may contain other materials such as a binder and a conductive agent as the need arises. Details regarding the binder and the conductive agent are, for example, the same as those in the case of explaining the positive electrode 33.

Examples of the negative electrode material capable of intercalating and deintercalating lithium include materials capable of intercalating and deintercalating lithium and containing, as a constituent element, at least one member of metal elements and semi-metal elements. This is because a high energy density is obtained. Such a negative electrode material may be a simple substance, an alloy or a compound of a metal element or a semi-metal element, or may be one containing one or two or more phases of the metal element or semi-metal element in at least a part thereof. In this specification, the alloy as referred to herein includes alloys containing at least one member of a metal element and at least one member of a semi-metal element in addition to alloys composed of two or more kinds of metal elements. Also, the "alloy" may contain a non-metal element. Examples of its texture include a solid solution, a eutectic (eutectic mixture), an intermetallic compound and one in which two or more kinds thereof coexist.

Examples of the foregoing metal element or semi-metal element include metal elements or semi-metal elements capable of forming an alloy together with lithium. Specific examples thereof include magnesium, boron (B), aluminum, gallium (Ga), indium (In), silicon, germanium (Ge), tin, lead (Pb), bismuth (Bi), cadmium (Cd), silver (Ag), zinc, hafnium (Hf), zirconium (Zr), yttrium (Y), palladium (Pd) and platinum (Pt). Of these, at least one member of silicon and tin is preferable. This is because the ability to intercalate and deintercalate lithium is large so that a high energy density is obtained.

Examples of the negative electrode material containing at least one member of silicon and tin include a simple substance, an alloy or a compound of silicon, a simple substance, an alloy or a compound of tin and a material containing one or two or more kinds of phases thereof in at least a part thereof.

Examples of the alloy of silicon include alloys containing, as a second constituent element other than silicon, at least one member selected from the group consisting of tin, nickel, copper, iron, cobalt, manganese, zinc, indium, silver, titanium, germanium, bismuth, antimony (Sb) and chromium. Examples of the compound of silicon include compounds containing oxygen or carbon (C), and the compound of silicon may contain the foregoing second constituent element in addition to silicon. Examples of the alloy or compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$) and LiSiO.

Examples of the alloy of tin include alloys containing, as a second constituent element other than tin, at least one member selected from the group consisting of silicon, nickel, copper, iron, cobalt, manganese, zinc, indium, silver, titanium, germanium, bismuth, antimony and chromium. Examples of the compound of tin include compounds containing oxygen or carbon, and the compound of tin may contain the foregoing second constituent element in addition to tin. Examples of the alloy or compound of tin include $SnSiO_3$, LiSnO and $Mg_2Sn$.

In particular, as the negative electrode material containing at least one member of silicon and tin, for example, those containing, in addition to tin as a first constituent element, second and third constituent elements are preferable. The second constituent element is at least one member selected from the group consisting of cobalt, iron, magnesium, titanium, vanadium (V), chromium, manganese, nickel, copper, zinc, gallium, zirconium, niobium (Nb), molybdenum, silver, indium, cerium (Ce), haffiium, tantalum (Ta), tungsten (W), bismuth and silicon. The third constituent element is at least one member selected from the group consisting of boron, carbon, aluminum and phosphorus (P). This is because in view of the fact that the negative electrode material contains the second and third constituent elements, the cycle characteristic is enhanced.

Above of all, the negative electrode material is preferably an SnCoC-containing material containing tin, cobalt and carbon as constituent elements and having a content of carbon of 9.9% by mass or more and not more than 29.7% by mass and a proportion of cobalt to the total sum of tin and cobalt (Co/(Sn+Co)) of 30% by mass or more and not more than 70% by mass. This is because a high energy density is obtained in the foregoing composition range.

This SnCoC-containing material may further contain other constituent elements as the need arises. As other constituent elements, for example, silicon, iron, nickel, chromium, indium, niobium, germanium, titanium, molybdenum, aluminum, phosphorus, gallium and bismuth are preferable. The SnCoC-containing material may contain two or more kinds of these elements. This is because a higher effect is obtained.

The SnCoC-containing material has a phase containing tin, cobalt and carbon, and this phase is preferably a lowly crystalline or amorphous phase. This phase is a reaction phase which is reactive with lithium, and an excellent cycle characteristic is obtained by this phase. In the case of using CuKox-rays as specified X-rays and defining a sweep rate at 1°/min, a half width value of a diffraction peak obtained by X-ray diffraction of this phase is preferably 1.0° or more in terms of a diffraction angle 2θ. This is because not only lithium is more smoothly intercalated and deintercalated, but the reactivity with an electrolyte is reduced.

Whether or not the diffraction peak obtained by the X-ray diffraction is corresponding to the reaction phase which is reactive with lithium can be easily determined by comparing an X-ray diffraction chart before and after an electrochemical reaction with lithium. For example, when a position of the diffraction peak changes before and after the electrochemical reaction with lithium, it is determined that the diffraction peak is corresponding to the reaction phase which is reactive with lithium. In that case, a diffraction peak of a lowly crystalline or amorphous phase is observed in the range of from 20° and 50° in terms of 2θ. This lowly crystalline or amorphous phase contains, for example, the foregoing respective constituent elements, and it may be considered that this phase is lowly crystallized or amorphized chiefly by carbon.

There may be the case where the SnCoC-containing material has, in addition to the lowly crystalline or amorphous phase, a phase containing a simple substance or a part of each of the constituent elements.

In particular, in the SnCoC-containing material, it is preferable that at least a part of carbon as the constituent element is bonded to the metal element or semi-metal element as other constituent element. This is because cohesion or crystallization of tin or the like is suppressed.

Examples of a method for examining the bonding state of elements include X-ray photoelectron spectroscopy (XPS). This XPS is a method in which soft X-rays (using AlKox-rays or MgKox-rays in commercially available units) are irradiated on the surface of a sample, and kinetic energy of photoelectrons which fly out from the sample surface are measured, thereby examining an element composition and a bonding state of elements in a region of several nm from the sample surface.

The bound energy of an inner orbital electron of an element changes in correlation with a charge density on the element from the standpoint of primary approximation. For example, in the case where the charge density of a carbon element is reduced due to an interaction with an element existing in the vicinity of the carbon element, an outer electron such as a 2p electron is reduced, and therefore, a 1s electron of the carbon element receives a strong constraining force from the shell. That is, when the charge density of an element is reduced, the constraining force becomes high. In XPS, when the bound energy increases, a peak is shifted into a high energy region.

In XPS, so far as graphite is concerned, a peak of a 1s orbit of carbon (C1s) appears at 284.5 eV in a unit in which the energy is calibrated such that a peak of a 4f orbit of a gold atom (Au4f) is obtained at 84.0 eV. Also, so far as the surface contamination carbon is concerned, the peak of C1s appears at 284.8 eV. On the other hand, in the case where the charge density of the carbon element becomes high, for example, when bonded to a more positive element than carbon, the peak of C1s appears in a lower region than 284.5 eV. That is, in the case where at least a part of carbons contained in the SnCoC-containing material is bonded to a metal element or a semi-metal element as other constituent element or the like, a peak of a composite wave of C1s obtained regarding the SnCoC-containing material appears in a lower region than 284.5 eV.

In the case of carrying out the XPS measurement, it is preferable that in covering the surface by the surface contamination carbon, the surface is lightly sputtered by an argon ion gun attached to the XPS unit. Also, in the case where the SnCoC-containing material to be measured exists in the negative electrode 34, it would be better that after taking apart the secondary battery, the negative electrode 34 is taken out and then rinsed with a volatile solvent such as dimethyl carbonate. This is made for the purpose of removing a solvent with low volatility and an electrolyte existing on the surface of the negative electrode 34. It is desirable that their sampling is carried out in an inert atmosphere.

Also, in the XPS measurement, for example, the peak of C1s is used for correcting the energy axis of a spectrum. In general, since the surface contamination carbon exists on the material surface, the peak of C1s of the surface contamination carbon is fixed at 284.8 eV and employed as an energy reference. In the XPS measurement, the waveform of the peak of C1s is obtained as a form including the peak of the surface contamination carbon and the peak of carbon in the SnCoC-containing material, and therefore, the peak of the surface contamination carbon and the peak of carbon in the SnCoC-containing material are separated by, for example, analysis using a commercially available software program. In the analysis of the waveform, a position of a main peak existing on the lowest bound energy side is employed as an energy reference (284.8 eV).

This SnCoC-containing material can be formed by, for example, melting a mixture obtained by mixing of raw materials of the respective constituent elements in an electric furnace, a high frequency induction furnace, an arc furnace, etc. and then solidifying the melt. Also, various atomizing processes such as gas atomization and water atomization, various rolling processes or processes utilizing a mechanochemical reaction such as a mechanical alloying process and a mechanical milling process may be adopted. Of these, a process utilizing a mechanochemical reaction is preferable. This is because the SnCoC-containing material is converted to have a lowly crystalline or amorphous structure. In the process utilizing a mechanochemical reaction, for example, a planetary ball mill unit or a manufacturing unit such as an attritor can be used.

For the raw material, though single bodies of the respective constituent elements may be mixed, it is preferred to use an alloy with respect to a part of the constituent elements other than carbon. This is because by adding carbon to such an alloy and synthesizing the raw material by a method utilizing a mechanical alloying process, a lowly crystalline or amorphous structure is obtained, and the reaction time is shortened, too. The form of the raw material may be a powder or a block.

In addition to this SnCoC-containing material, an SnCoFeC-containing material having tin, cobalt, iron and carbon as constituent elements is also preferable. A composition of this SnCoFeC-containing material can be arbitrarily set up. For example, in the case where a content of iron is set up low, a composition in which a content of carbon is 9.9% by mass or more and not more than 29.7% by mass, a content of iron is 0.3% by mass or more and not more than 5.9% by mass, and a proportion of cobalt to the total sum of tin and cobalt (Co/(Sn+Co)) is 30% by mass or more and not more than 70% by mass is preferable. Also, for example, in the case where a content of iron is set up high, a composition in which a content of carbon is 11.9% by mass or more and not more than 29.7% by mass, a proportion of the total sum of cobalt and iron to the total sum of tin, cobalt and iron ((Co+Fe)/(Sn+Co+Fe)) is 26.4% by mass or more and not more than 48.5% by mass, and a proportion of cobalt to the total sum of cobalt and iron (Co/(Co+Fe)) is 9.9% by mass or more and not more than 79.5% by mass is preferable. This is because a high energy density is obtained in the foregoing composition range. The crystallinity, measurement method, bonding state of elements and formation method of this SnCoFeC-containing material and the like are the same as in the foregoing SnCoC-containing material.

The negative electrode active material layer 34B using, as a negative electrode material capable of intercalating and deintercalating lithium, a simple substance, an alloy or a compound of silicon, a simple substance, an alloy or a compound of tin or a material containing one or two or more kinds of phases thereof in at least a part thereof is formed by, for example, a vapor phase process, a liquid phase process, a spraying process, a coating process, a baking process or a combined process of two or more kinds of these processes. In that case, it is preferable that the negative electrode collector 34A and the negative electrode active material layer 34B are alloyed on at least a part of the interface therebetween. In detail, on the interface between the both, the constituent elements of the negative electrode collector 34A may be diffused into the negative electrode active material layer 34B, the constituent elements of the negative electrode active material layer 34B may be diffused into the negative electrode collector 34A, or these constituent elements may be mutually diffused. This is because not only breakage to be caused due to expansion and shrinkage of the negative electrode active material layer 34B at the time of charge and discharge can be suppressed, but electron conductivity between the negative electrode collector 34A and the negative electrode active material layer 34B is enhanced.

Examples of the vapor phase process include a physical deposition process and a chemical deposition process, specifically a vacuum vapor deposition process, a sputtering process, an ion plating process, a laser abrasion process, a thermal chemical vapor deposition (CVD) process and a plasma chemical vapor deposition process. As the liquid phase process, known techniques such as electrolytic plating and non-electrolytic plating can be adopted. The coating process as referred to herein is, for example, a process in which after mixing a granular negative electrode active material with a binder and the like, the mixture is dispersed in a solvent and coated. The baking process as referred to herein is, for example, a process in which after coating by a coating process, the coated material is heat treated at a higher temperature than a melting point of the binder, etc. As to the baking process, known techniques can be utilized, and examples thereof include an atmospheric baking process, a reaction baking process and a hot press baking process.

In addition to the foregoing, examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm or more. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtained, an excellent cycle characteristic is obtained, and the carbon material also functions as a conductive agent. The shape of the carbon material may be any of a fibrous shape, a spherical shape, a granular shape or a flaky shape.

Also, examples of the negative electrode material capable of intercalating and deintercalating lithium include metal oxides and polymer compounds capable of intercalating and deintercalating lithium. Examples of the metal oxide include iron oxide, ruthenium oxide and molybdenum oxide; and examples of the polymer compound include polyacetylene, polyaniline and polypyrrole.

As a matter of course, the negative electrode material capable of intercalating and deintercalating lithium may be a material other than those described above. Also, the foregoing series of negative electrode materials may be a mixture of two or more kinds thereof in an arbitrary combination.

The negative electrode active material made of the foregoing negative electrode material is composed of plural granules. That is, the negative electrode active material layer 34B has plural negative electrode active material particles, and the negative electrode active material particle is formed by, for example, the foregoing vapor phase process, etc. However, the negative electrode active material particle may be formed by a process other than the vapor phase process.

In the case where the negative electrode active material particle is formed by a deposition process such as a vapor phase process, the negative electrode active material particle may have a single-layered structure formed through a single deposition step, or may have a multilayered structure formed through plural deposition steps. However, in the case where the negative electrode active material particle is formed by a vapor deposition process accompanied with high heat at the time of deposition, it is preferable that the negative electrode active material particle has a multilayered structure. This is because when the deposition step of the negative electrode material is carried out in a divided manner of plural times (the negative electrode material is successively formed thin and deposited), the time when the negative electrode collector 34A is exposed at high temperatures becomes short, and a thermal damage is hardly given as compared with the case of carrying out the deposition step once.

For example, this negative electrode active material particle grows in a thickness direction of the negative electrode active material layer 34B from the surface of the negative electrode collector 34A and is connected to the negative electrode collector 34A in a root thereof. In that case, it is preferable that the negative electrode active material particle is formed by a vapor phase process and alloyed on at least a part of the interface with the negative electrode collector 34A as described previously. In detail, on the interface between the both, the constituent elements of the negative electrode collector 34A may be diffused into the negative electrode active material particle, the constituent elements of the negative electrode active material particle may be diffused into the negative electrode collector 34A, or the constituent elements of the both may be mutually diffused.

In particular, it is preferable that the negative electrode active material layer 34B has an oxide-containing film for coating the surface of the negative electrode active material particle (region coming into contact with the electrolytic solution) as the need arises. This is because the oxide-containing film functions as a protective film against the electrolytic solution, and even when charge and discharge are repeated, a decomposition reaction of the electrolytic solution is suppressed, and therefore, the cycle characteristic is enhanced. This oxide-containing film may coat a part or the whole of the surface of the negative electrode active material particle.

For example, this oxide-containing film contains an oxide of at least one member selected from the group consisting of silicon, germanium and tin. Of these, it is preferable that the oxide-containing film contains an oxide of silicon. This is because not only it is easily coated over the entire surface of the negative electrode active material particle, but an excellent protective action is obtained. As a matter of course, the oxide-containing film may contain an oxide other than those described above. This oxide-containing film is formed by, for example, a vapor phase process or a liquid phase process. Of these, a liquid phase process such as a liquid phase deposition process, a sol-gel process, a coating process and a dip coating process is preferable, with a liquid phase deposition processing being more preferable. This is because the surface of the negative electrode active material particle can be easily coated over a wide range thereof.

Also, it is preferable that the negative electrode active material layer 34B has a metal material which is not alloyed with an electrode reactant in a gap between particles of the negative electrode active material particle or in a gap within the particle as the need arises. This is because not only the plural negative electrode active material particles are bound to each other via the metal material, but in view of the fact that the metal material exists in the foregoing gap, expansion and shrinkage of the negative electrode active material layer 34B are suppressed, whereby the cycle characteristic is enhanced.

For example, this metal material contains, as a constituent element, a metal element which is not alloyed with lithium. Examples of such a metal element include at least one member selected from the group consisting of iron, cobalt, nickel, zinc and copper. Of these, cobalt is preferable. This is because not only the metal material is easy to come into the foregoing gap, but an excellent binding action is obtained. As a matter of course, the metal material may contain a metal element other than those described above. However, the "metal material" as referred to herein is a broad concept including not only single bodies but alloys and metal compounds. This metal material is formed by, for example, a vapor phase process or a liquid phase process. Of these, a liquid phase process such as an electrolytic plating process and a non-electrolytic plating process is preferable, and an electrolytic plating process is more preferable. This is because not only the metal material is easy to come into the foregoing gap, but the formation time may be short.

The negative electrode active material layer 34B may contain either one or both of the foregoing oxide-containing film and metal material. However, in order to more enhance the cycle characteristic, it is preferable that the negative electrode active material layer 34B contains the both of them.

Here, the detailed configuration of the negative electrode 34 is described with reference to FIGS. 4 and 5.

First of all, the case where the negative electrode active material layer 34B has an oxide-containing film as well as plural negative electrode active material particles. FIG. 4 schematically shows a sectional structure of the negative electrode 34 according to the embodiment; and FIG. 5 schematically shows a sectional structure of a negative electrode of Referential Example. FIGS. 4 and 5 each shows the case where the negative electrode active material particle has a single-layered structure.

Figure 4:
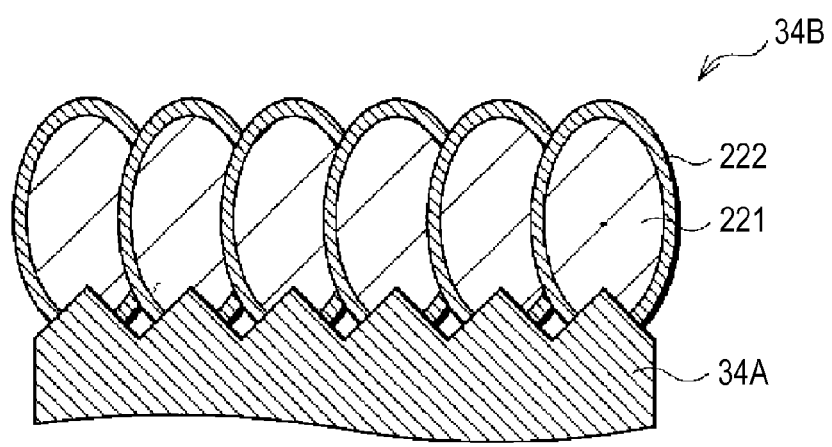
FIG. 4 is a sectional view showing enlargedly a part of a negative electrode shown in FIG. 1.

As shown in FIG. 4, in the negative electrode according to the embodiment for example, when a negative electrode material is deposited on the negative electrode collector 34A by a vapor phase process such as a vapor deposition process, plural negative electrode active material particles 221 are formed on the negative electrode collector 34A. In that case, when the surface of the negative electrode collector 34A is roughed, thereby allowing plural projections (for example, fine particles formed by an electrolysis treatment) to exist on the subject surface, the negative electrode active material particle 221 grows in a thickness direction in every projection. Thus, the plural negative electrode active material particles 221 are arranged on the negative electrode collector 34A and also connected to the surface of the negative electrode collector 34A in the roots thereof. Thereafter, for example, when an oxide-containing film 222 is formed on the surface of the negative electrode active material particle 221 by a liquid phase process such as a liquid phase deposition process, the oxide-containing film 222 coats the surface of the negative electrode active material particle 221 substantially entirely, and in particular, the oxide-containing film 222 coats the negative electrode active material particle 221 over a wide range of from the top to the root. The coating state over a wide range by this oxide-containing film 222 is a characteristic feature obtained in the case where the oxide-containing film 222 is formed by a liquid phase process. That is, when the oxide-containing film 222 is formed by a liquid phase process, its coating action widely reaches not only the top of the negative electrode active material particle 221 but the root thereof, and therefore, the negative electrode active material particle 221 is coated by the oxide-containing film 222 to an extent of the root thereof.

Figure 5:
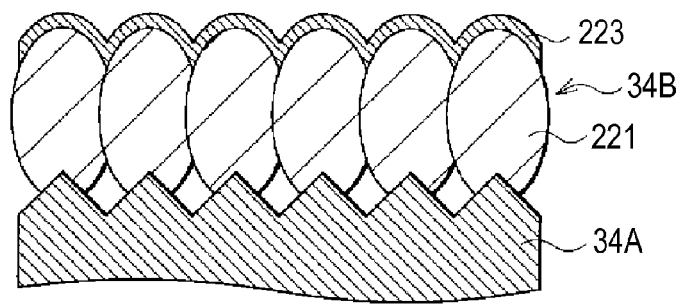
FIG. 5 is a sectional view showing a negative electrode of Referential Example relative to the negative electrode shown in FIG. 4.

On the other hand, as shown in FIG. 5, in the negative electrode of Referential Example, for example, when after forming the negative electrode active material particle 221 by a vapor phase process, an oxide-containing film 223 is similarly formed by a vapor phase process, the oxide-containing film 223 coats only the top of the negative electrode active material particle 221. The narrow-range coating state by this oxide-containing film 223 is a characteristic feature obtained in the case where the oxide-containing film 223 is formed by a vapor phase process. That is, when the oxide-containing film 223 is formed by a vapor phase process, its coating action reaches the top of the negative electrode active material particle 221 but does not reach the root thereof, and therefore, the root is not coated by the oxide-containing film 223.

In FIG. 4, the case of forming the negative electrode active material layer 34B by a vapor phase process has been described. However, in the case of forming the negative electrode active material layer 34B by a sintering process or the like, the oxide-containing film is similarly formed so as to coat the surfaces of plural negative electrode active material particles substantially entirely.

Figure 6A:
FIG. 6A is an SEM photograph showing a sectional structure of a negative electrode shown in FIG. 1.
Figure 6B:
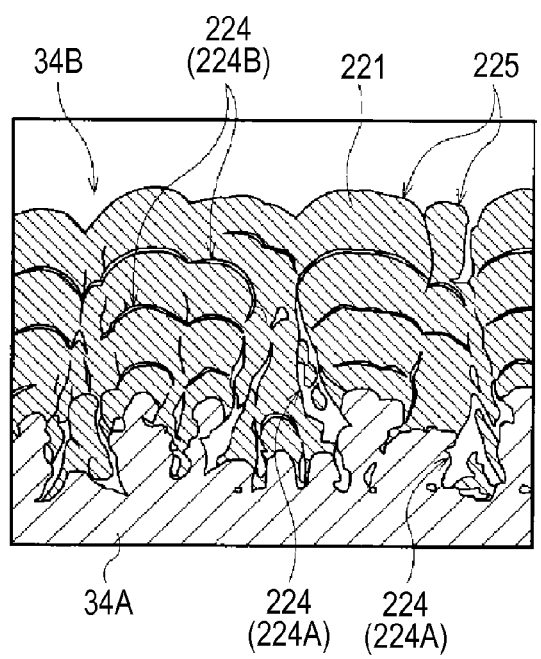
FIG. 6B is a schematic view thereof.

Next, the case where the negative electrode active material layer 34B contains plural negative electrode active material particles and a metal material which is not alloyed with an electrode reactant is described. FIGS. 6A and 6B each shows enlargedly a sectional structure of the negative electrode 34, in which FIG. 6A is a scanning electron microscope (SEM) photograph (secondary electron image) showing enlargedly a sectional structure of the negative electrode 34, and FIG. 6B is a schematic view of the SEM image shown in FIG. 6A. FIGS. 6A and 6B show the case where the plural negative electrode active material particles 221 have a multilayered structure within the particle.

In the case where the negative electrode active material particle 221 has a multilayered structure, plural gaps 224 are generated in the negative electrode active material layer 34B due to an arrangement structure, a multilayered structure and a surface structure of the plural negative electrode active material particles 221. The gap 224 includes two kinds of gaps 224A and 224B which are chiefly classified depending upon the generation cause. The gap 224A is generated between the adjacent negative electrode active material particles 221 to each other, and the gap 224B is generated between the respective levels within the negative electrode active material particle 221.

There may be the case where a void 225 is generated on the exposed surface (outermost surface) of the negative electrode active material particle 221. When a fine projection (not shown) in a whisker form is generated on the surface of the negative electrode active material particle 221, this gap 225 is generated between the projections. There may be the case where this void 225 is generated entirely on the exposed surface of the negative electrode active material particle 221 or generated in a part thereof. However, since the projection in a whisker form is generated on the surface of the negative electrode active material particle 221 every time of the formation thereof, there may be the case where the void 225 is generated not only on the exposed surface of the negative electrode active material particle 221 but between the respective levels.

Figure 7A:
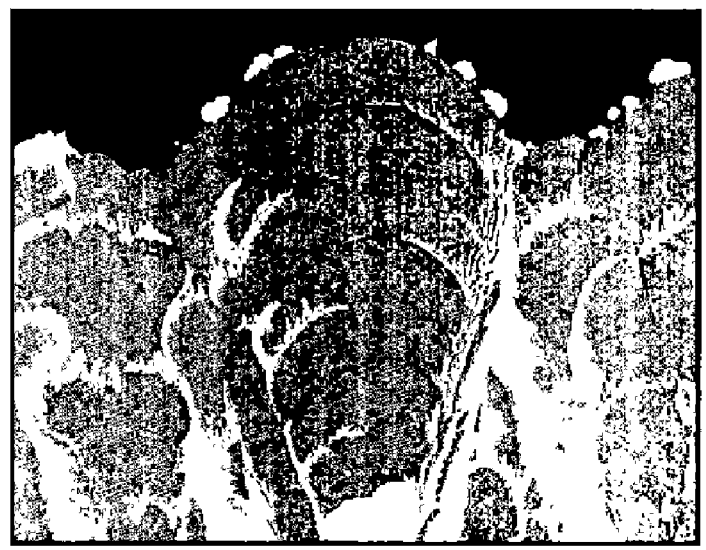
FIG. 7A is an SEM photograph showing other sectional structure of a negative electrode shown in FIG. 1.
Figure 7B:
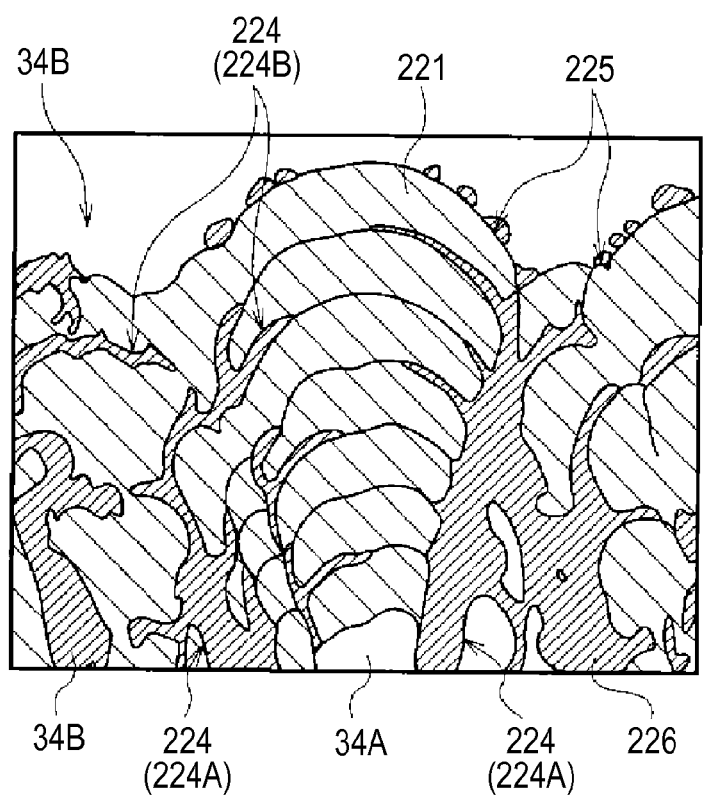
FIG. 7B is a schematic view thereof.

FIGS. 7A and 7B each shows other sectional structure of the negative electrode 34 and are corresponding to FIGS. 6A and 6B, respectively. The negative electrode active material layer 34B contains a metal material 226 which is not alloyed with an electrode reactant in the gaps 224A and 224B. In that case, though the metal material 226 may be present only in either one of the gaps 224A and 224B, it is preferable that the metal material 226 is present in the both of them. This is because a higher effect is obtained.

This metal material 226 comes into the gap 224A between the adjacent negative electrode active material particles 221 to each other. In detail, in the case where the negative electrode active material particle 221 is formed by a vapor phase process or the like, as described previously, the negative electrode active material particle 221 grows in every projection existing on the surface of the negative electrode collector 34A, and therefore, the gap 224A is generated between the adjacent negative electrode active material particles 221 to each other. Since this gap 224A may cause a lowering of binding properties of the negative electrode active material layer 34B, the metal material 226 is filled in the gap 224A for the purpose of enhancing the binding properties. In that case, though even a part of the gap 224A may be filled with the metal material 226, it is preferable that the filling amount thereof is as large as possible. This is because the binding properties of the negative electrode active material layer 34B are more enhanced. The filling amount of the metal material 226 is preferably 20% or more, more preferably 40% or more, and further preferably 80% or more.

Also, the metal material 226 comes into the gap 224B within the negative electrode active material particle 221. In detail, in the case where the negative electrode active material particle 221 has a multilayered structure, the gap 224B is generated between the respective levels. Similar to the foregoing gap 224A, this gap 224B may cause a lowering of binding properties of the negative electrode active material layer 34B, the metal material 226 is filled in the gap 224B for the purpose of enhancing the binding properties. In that case, though even a part of the gap 224B may be filled with the metal material 226, it is preferable that the filling amount thereof is as large as possible. This is because the binding properties of the negative electrode active material layer 34B are more enhanced.

In the negative electrode active material layer 34B, in order to prevent adverse influences of a fine projection (not shown) in a whisker form, which is generated on the exposed surface of the negative electrode active material particle 221 in the uppermost layer, against the performance of a secondary battery, the metal material 226 may be present in the void 225. In detail, in the case where the negative electrode active material particle 221 is formed by a vapor phase process or the like, since a fine projection in a whisker form is generated on the surface thereof, the void 225 is generated between the projections. This void 225 introduces an increase of the surface area of the negative electrode active material particle 221 and increases the amount of an irreversible film formed on the surface thereof, and therefore, there is a possibility that a lowering of the degree of progress of an electrode reaction (charge and discharge reaction) is caused. Accordingly, in order to suppress a lowering of the degree of progress of an electrode reaction, the metal material 226 is embedded in the void 225. In that case, though even a part of the void 225 may be embedded, it is preferable that the embedding amount is as large as possible. This is because a lowering of the degree of progress of an electrode reaction is more suppressed. In FIGS. 6A and 6B, what the metal material 226 is interspersed on the surface of the negative electrode active material particle 221 in the uppermost layer demonstrates that the foregoing fine projection exists in the interspersed area. As a matter of course, it is not always the case that the metal material 226 must be interspersed on the surface of the negative electrode active material particle 221, but the metal material 226 may coat the entire surface thereof.

In particular, the metal material 226 which has come into the gap 224B also functions to embed the void 225 in the respective levels. In details, in the case where the negative electrode material is deposited plural times, the foregoing fine projection is generated on the surface of the negative electrode active material particle 221 every time of the deposition. As noted from this fact, the metal material 226 is filled in the gap 224B in the respective levels and also embedded in the void 225 in the respective levels.

In FIGS. 6A and 6B and FIGS. 7A and 7B, the case where the negative electrode active material particle 221 has a multilayered structure, and the both of the gaps 224A and 224B exist in the negative electrode active material layer 34B has been described, and therefore, the negative electrode active material layer 34B has the metal material 226 in the gaps 224A and 224B. On the other hand, in the case where the negative electrode active material particle 221 has a single-layered structure, and only the gap 224A exists in the negative electrode active material layer 34B, the negative electrode active material layer 34B has the metal material 226 only in the gap 224A. As a matter of course, since the void 225 is generated in the both cases, the metal material 226 is present in the void 225 in all of the cases.

The separator 35 partitions the positive electrode 33 and the negative electrode 34 from each other and allows a lithium ion to pass therethrough while preventing a short circuit of the current to be caused due to the contact of the both electrodes. This separator 35 is, for example, configured of a porous film made of a synthetic resin such as polytetrafluoroethylene, polypropylene and polyethylene, a porous film made of a ceramic, or the like and may be a laminate of two or more kinds of these porous films.

An electrolytic solution which is a liquid electrolyte is impregnated in this separator 35. This electrolytic solution contains a solvent and an electrolyte salt dissolved therein.

For example, the solvent contains one or two or more kinds of non-aqueous solvents such as organic solvents. Examples of such a non-aqueous solvent include carbonic ester based solvents such as ethylene carbonate, propylene carbonate, butylene carbonate, dimethyl carbonate, diethyl carbonate, ethylmethyl carbonate and methylpropyl carbonate. This is because excellent capacity characteristic, cycle characteristic and storage characteristic are obtained. Of these, a mixture of a high-viscosity solvent (for example, ethylene carbonate, propylene carbonate, etc.) and a low-viscosity solvent (for example, dimethyl carbonate, ethylmethyl carbonate, diethyl carbonate, etc.) is preferable. This is because dissociation properties of an electrolyte salt and mobility of an ion are enhanced, and therefore, a higher effect is obtained. It is preferable that this solvent contains an unsaturated bond-containing cyclic carbonic ester represented by each of the following formulae (D) to (F). This is because the cycle characteristic is enhanced. These compounds may be used singly or in admixture of plural kinds thereof.

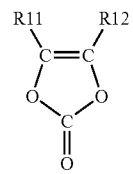

Formula (D)

In the formula (D), R11 and R12 each represents a hydrogen group or an alkyl group.

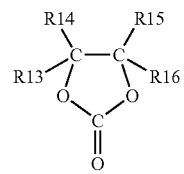

Formula (E)

In the formula (E), R13 to R16 each represents a hydrogen group, an alkyl group, a vinyl group or an allyl group, provided that at least one of R13 to R16 is a vinyl group or an allyl group.

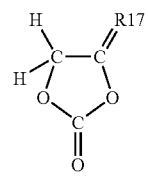

Formula (F)

In the formula (F), R17 represents an alkylene group.

The unsaturated bond-containing cyclic carbonic ester represented by the formula (D) is a vinylene carbonate based compound. Examples of the vinylene carbonate based compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one and 4-trifluoromethyl-1,3-dioxol-2-one. Of these, vinylene carbonate is preferable. This is because not only this compound is easily available, but a high effect is obtained.

The unsaturated bond-containing cyclic carbonic ester represented by the formula (E) is a vinylethylene carbonate based compound. Examples of the vinylethylene carbonate based compound include vinylethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolane-2-one, 4,4-divinyl-1,3-dioxolan-2-one and 4,5-divinyl-1,3-dioxolan-2-one. Of these, vinylethylene carbonate is preferable. This is because not only this compound is easily available, but a high effect is obtained. As a matter of course, all of R13 to R16 may be a vinyl group or may be an allyl group, or a vinyl group and an allyl group may coexist.

The unsaturated bond-containing cyclic carbonic ester represented by the formula (F) is a methylene ethylene carbonate based compound. Examples of the methylene ethylene carbonate based compound include 4-methylene-1,3-dioxolan-2-one, 4,4-dimethyl-5-methylene-1,3-dioxolan-2-one and 4,4-diethyl-5-methylene-1,3-dioxolan-2-one. This methylene ethylene carbonate based compound may be a compound containing two methylene groups as well as a compound containing one methylene group (the compound represented by the formula (F)).

In addition to those represented by the formulae (D) to (F), the unsaturated bond-containing cyclic carbonic ester may be a benzene ring-containing carbonic catechol (catechol carbonate).

Also, it is preferable that the solvent contains at least one member of a chain carbonic ester containing a halogen as a constituent element, which is represented by the following formula (A), and a cyclic carbonic ester containing a halogen as a constituent element, which is represented by the following formula (B). This is because a stable protective film is formed on the surface of the negative electrode 34, and a decomposition reaction of an electrolytic solution is suppressed, and therefore, the cycle characteristic is enhanced.

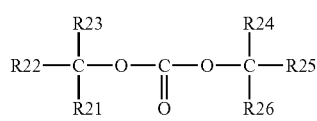

Formula (A)

In the formula (A), R21 to R26 each represents a hydrogen group, a halogen group, an alkyl group or a halogenated alkyl group, provided that at least one of R21 to R26 is a halogen group or a halogenated alkyl group.

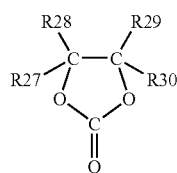

Formula (B)

In the formula (B), R27 to R30 each represents a hydrogen group, a halogen group, an alkyl group or a halogenated alkyl group, provided that at least one of R27 to R30 is a halogen group or a halogenated alkyl group.

In the formula (A), R21 to R26 may be the same or different. The same is also applicable with respect to R27 to R30 in the formula (B). Though the kind of the halogen is not particularly limited, examples thereof include at least one member selected from the group consisting of fluorine, chlorine and bromine. Of these, fluorine is preferable. This is because a high effect is obtained. As a matter of course, other halogen may be applicable.

The number of the halogen is more preferably 2 than 1 and may be 3 or more. This is because the ability for forming a protective film is high, and a firmer and stable protective film is formed, and therefore, a decomposition reaction of an electrolytic solution is more suppressed.

Examples of the chain carbonic ester containing a halogen, which is represented by the formula (A), include fluoromethylmethyl carbonate, bis(fluoromethyl) carbonate and difluoromethylmethyl carbonate. These compounds may be used singly or in admixture of plural kinds thereof.

Examples of the cyclic carbonic ester containing a halogen, which is represented by the formula (B), include a series of compounds represented by the following formulae. That is, examples thereof include compounds of a group of the formula (B-1) inclusive of the following (1) 4-fluoro-1,3-dioxolan-2-one, (2) 4-chloro-1,3-dioxolan-2-one, (3) 4,5-difluoro-1,3-dioxolan-2-one, (4) tetrafluoro-1,3-dioxolan-2-one, (5) 4-fluoro-5-chloro-1,3-dioxolan-2-one, (6) 4,5-dichloro-1,3-dioxolan-2-one, (7) tetrachloro-1,3-dioxolan-2-one, (8) 4,5-bistrifluoromethyl-1,3-dioxolan-2-one, (9) 4-trifluoromethyl-1,3-dioxolan-2-one, (10) 4,5-difluoro-4,5-dimethyl-1,3-dioxolan-2-one, (11) 4-methyl-5,5-difluoro-1,3-dioxolan-2-one and (12) 4-ethyl-5,5-difluoro-1,3-dioxolan-2-one.

Also, examples include compounds of a group of the formula (B-2) inclusive of the following (1) 4-trifluoromethyl-5-fluoro-1,3-dioxolan-2-one, (2) 4-trifluoromethyl-5-methyl-1,3-dioxolan-2-one, (3) 4-fluoro-4,5-dimethyl-1,3-dioxolan-2-one, (4) 4,4-difluoro-5-(1,1-difluoroethyl)-1,3-dioxolan-2-one, (5) 4,5-dichloro-4,5-dimethyl-1,3-dioxolan-2-one, (6) 4-ethyl-5-fluoro-1,3-dioxolan-2-one, (7) 4-ethyl-4,5-difluoro-1,3-dioxolan-2-one, (8) 4-ethyl-4,5,5-trifluoro-1,3-dioxolan-2-one and (9) 4-fluoro-4-methyl-1,3-dioxolan-2-one. These compounds may be used singly or in admixture of plural kinds thereof.

Formula (B-1)

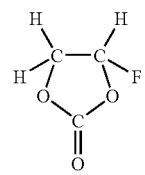

(1)

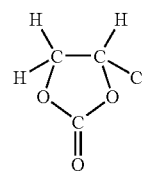

(2)

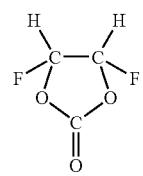

(3)

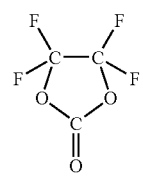

(4)

(5)
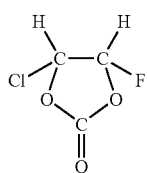
(6)
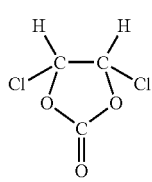
(7)
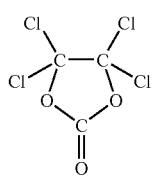
(8)
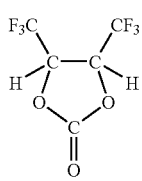
(9)
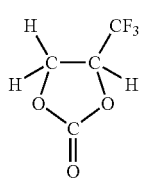
(10)
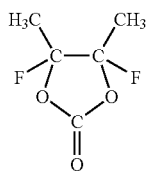
(11)
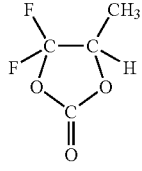
(12)
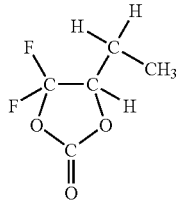
Formula (B-2)
(1)
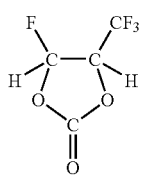
(2)
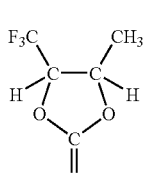
(3)
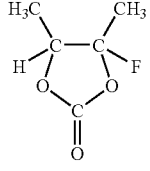
(4)
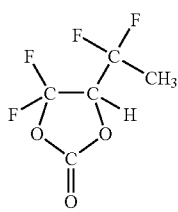
(5)
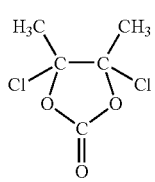
(6)
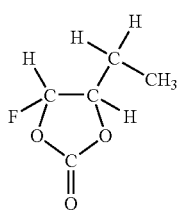
(7)
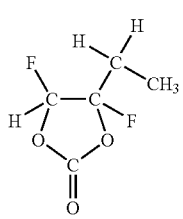
(8)
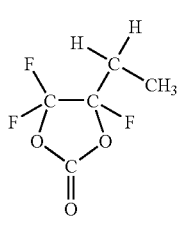

-continued

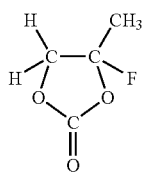
(9)

Of these, 4-fluoro-1,3-dioxolan-2-one and 4,5-difluoro-1,3-dioxolan-2-one are preferable; and 4,5-difluoro-1,3-dioxolan-2-one is more preferable. In particular, when 4,5-difluoro-1,3-dioxolan-2-one is concerned, a trans isomer is more preferable than a cis isomer. This is because not only this compound is easily available, but a high effect is obtained.

The electrolyte salt contains, for example, one or two or more kinds of light metal salts such as lithium salts. Examples of the lithium salt include lithium hexafluorophosphate, lithium tetrafluoroborate, lithium perchlorate and lithium hexafluoroarsenate. This is because excellent capacity characteristic, cycle characteristic and storage characteristic are obtained. Of these, lithium hexafluorophosphate is preferable. This is because an internal resistance is lowered, and therefore, a higher effect is obtained.

It is preferable that this electrolyte salt contains at least one member selected from the group consisting of compounds represented by the following formulae. This is because when such a compound is used together with the foregoing lithium hexafluorophosphate or the like, a higher effect is obtained. In the following, R33s may be the same or different; and the same is also applicable with respect to R41 to R43, R51 and R52.

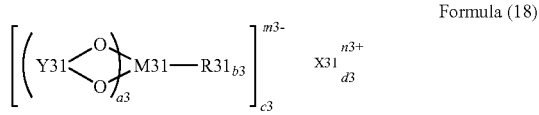
Formula (18)

In the formula (18), X31 represents an element belonging to the Group 1 or the Group 2 of the long form of the periodic table or aluminum. M31 represents a transition metal or an element belonging to the Group 13, the Group 14 or the Group 15 of the long form of the periodic table. R31 represents a halogen group. Y31 represents —OC—R32—CO—, —OC—C(R33)$_2$— or —OC—CO—. However, R32 represents an alkylene group, a halogenated alkylene group, an arylene group or a halogenated arylene group. R33 represents an alkyl group, a halogenated alkyl group, an aryl group or a halogenated aryl group. a3 represents an integer of from 1 to 4; b3 represents an integer of 0, 2 or 4; and c3, d3, m3 and n3 each represents an integer of from 1 to 3.

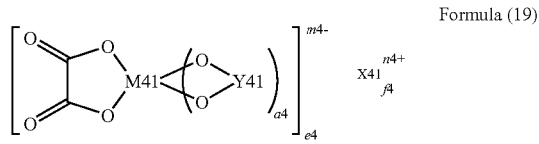
Formula (19)

In the formula (19), X41 represents an element belonging to the Group 1 or the Group 2 of the long form of the periodic table. M41 represents a transition metal or an element belonging to the Group 13, the Group 14 or the Group 15 of the long form of the periodic table. Y41 represents —OC—(C(R41)$_2$)$_{b4}$—CO—, —(R43)$_2$C—(C(R42)$_2$)$_{c4}$—CO—, —(R43)$_2$C—(C(R42)$_2$)$_{c4}$—C(R43)$_2$—, —(R43)$_2$C—(C(R42)$_2$)$_{c4}$—SO$_2$—, —O$_2$S—(C(R42)$_2$)$_{d4}$—SO$_2$— or —OC—(C(R42)$_2$)$_{d4}$—SO$_2$—. However, R41 and R43 each represents a hydrogen group, an alkyl group, a halogen group or a halogenated alkyl group; and at least one of respective R41 and R43 is a halogen atom or a halogenated alkyl group. R42 represents a hydrogen group, an alkyl group, a halogen group or a halogenated alkyl group. a4, c4 and n4 each represents an integer of 1 or 2; b4 and d4 each represents an integer of from 1 to 4; c4 represents an integer of from 0 to 4; and f4 and m4 each represents an integer of from 1 to 3.

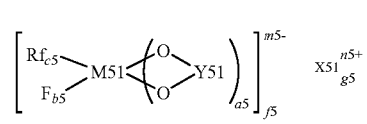
Formula (20)

In the formula (20), X51 represents an element belonging to the Group 1 or the Group 2 of the long form of the periodic table. M51 represents a transition metal or an element belonging to the Group 13, the Group 14 or the Group 15 of the long form of the periodic table. Rf represents a fluorinated alkyl group or a fluorinated aryl group each having from 1 to 10 carbon atoms. Y51 represents —OC—(C(R51)$_2$)$_{d5}$—CO—, —(R52)$_2$C—(C(R51)$_2$)$_{d5}$—CO—, —(R52)$_2$C—(C(R51)$_2$)$_{d5}$—C(R52)$_2$—, —(R52)$_2$C—(C(R51)$_2$)$_{d5}$—SO$_2$—, —O$_2$S—(C(R51)$_2$)$_{e5}$—SO$_2$— or —OC—(C(R51)$_2$)$_{e5}$—SO$_2$—. However, R51 represents a hydrogen group, an alkyl group, a halogen group or a halogenated alkyl group. R52 represents a hydrogen group, an alkyl group, a halogen group or a halogenated alkyl group, and at least one of R52 is a halogen group or a halogenated alkyl group. a5, f5 and n5 each represents an integer of 1 or 2; b5, c5 and e5 each represents an integer of from 1 to 4; d5 represents an integer of from 0 to 4; and g5 and m5 each represents an integer of from 1 to 3.

The "long form of the periodic table" referred to herein is one expressed by a revised version of the nomenclature of inorganic chemistry advocated by IUPAC (International Union of Pure and Applied Chemistry). Specifically, examples of the element belonging to the Group 1 include hydrogen, lithium, sodium, potassium, rubidium, cesium and francium. Examples of the element belonging to the Group 2 include beryllium, magnesium, calcium, strontium, barium and radium. Examples of the element belonging to the Group 13 include boron, aluminum, gallium, indium and thallium. Examples of the element belonging to the Group 14 include carbon, silicon, germanium, tin and lead. Examples of the element belonging to the Group 15 include nitrogen, phosphorus, arsenic, antimony and bismuth.

Examples of the compound represented by the formula (18) include compounds represented by (1) to (6) of the following formula (21). Examples of the compound represented by the formula (19) include compounds represented by (1) to (8) of the following formula (22). Examples of the compound represented by the formula (20) include a compound represented by the following formula (23). Needless to say, it should be construed that the compound is not limited to the compounds represented by the formulae (21) to (23) so far as the compound has a structure represented by any of the formulae (18) to (20).

Formula (21)

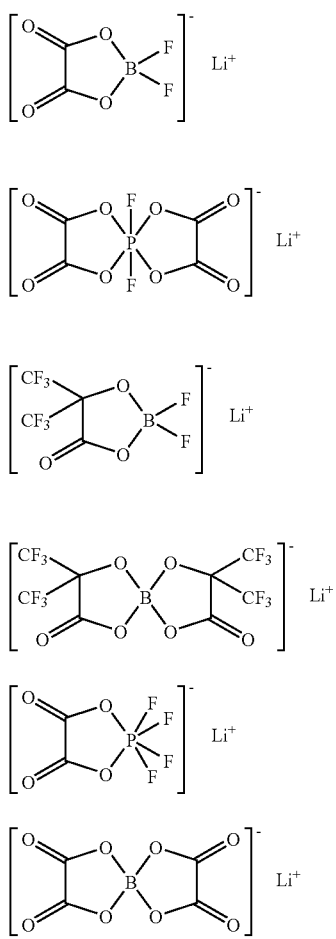

Formula (22)

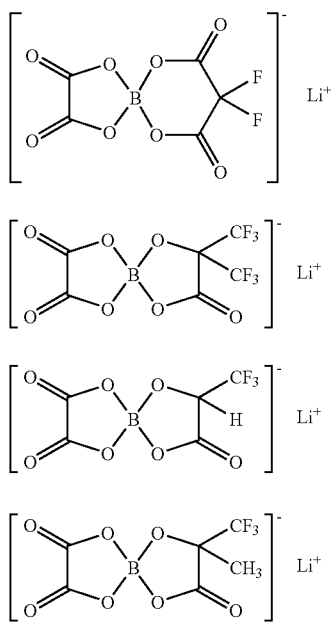

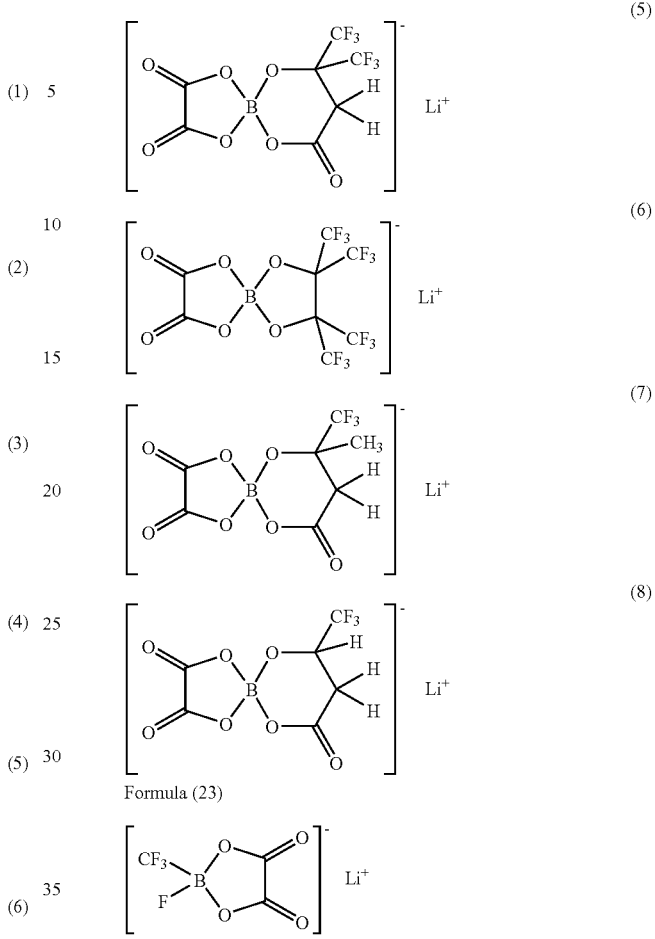

Formula (23)

Also, the electrolyte salt may contain at least one member selected from the group consisting of compounds represented by the following formulae (24) to (26). This is because when such a compound is used together with the foregoing lithium hexafluorophosphate or the like, a higher effect is obtained. In the formula (24), m and n may be the same or different. The same is also applicable with respect to p, q and r in the formula (26).

$$LiN(C_mF_{2m+1}SO_2)(C_nF_{2n+1}SO_2) \quad \text{Formula (24)}$$

In the formula (24), m and n each represents an integer of 1 or more.

Formula (25)

In the formula (25), R61 represents a linear or branched perfluoroalkylene group having 2 or more and not more than 4 carbon atoms.

$$LiC(C_pF_{2p+1}SO_2)(C_qF_{2q+1}SO_2)(C_rF_{2r+1}SO_2) \quad \text{Formula (26)}$$

In the formula (26), p, q and r each represents an integer of 1 or more.

Examples of the chain compound represented by the formula (24) include bis(trifluoromethanesulfonyl)imide lithium (LiN(CF$_3$SO$_2$)$_2$), bis(pentafluoroethanesulfonyl)imide lithium (LiN(C$_2$F$_2$SO$_2$)$_2$), (trifluoromethanesulfonyl)(pentafluoroethanesulfonyl)imide lithium (LiN(CF$_3$SO$_2$)(C$_2$F$_5$SO$_2$)), (trifluoromethanesulfonyl)(heptafluoropropanesulfonyl)imide lithium (LiN(CF$_3$SO$_2$)(C$_3$F$_7$SO$_2$)) and (trifluoromethanesulfonyl)(nonafluorobutanesulfonyl)imide lithium (LiN(CF$_3$SO$_2$)(C$_4$F$_9$SO$_2$)). These compounds may be used singly or in admixture of plural kinds thereof.

Examples of the cyclic compound represented by the formula (25) include a series of compounds represented by the following formula (27). That is, examples of the compound represented by the formula (27) include the following (1) 1,2-perfluoroethanedisulfonylimide lithium, (2) 1,3-perfluoropropanedisulfonylimide lithium (3) 1,3-perfluorobutanedisulfonylimide lithium and (4) 1,4-perfluorobutanedisulfonylimide lithium. These compounds may be used singly or in admixture of plural kinds thereof. Of these, 1,2-perfluoroethanedisulfonylimide lithium is preferable. This is because a high effect is obtained.

Formula (27)

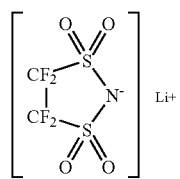
(1)

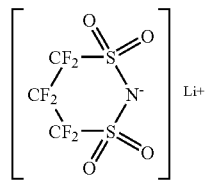
(2)

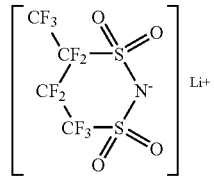
(3)

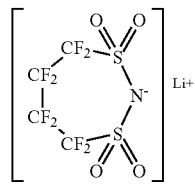
(4)

Examples of the chain compound represented by the formula (26) include lithium tris(trifluoromethanesulfonyl)methide (LiC(CF$_3$SO$_2$)$_3$).

A content of the electrolyte salt is preferably 0.3 moles/kg or more and not more than 3.0 moles/kg relative to the solvent. This is because when the content of the electrolyte salt falls outside the foregoing range, there is a possibility that the ionic conductivity is extremely lowered.

The electrolytic solution may contain various additives together with the solvent and the electrolyte salt. This is because the chemical stability of the electrolytic solution is more enhanced.

Examples of the additive include sultones (cyclic sulfonic acid esters). Examples of the sultone include propane sultone and propene sultone. Of these, propane sultone is preferable. These compounds may be used singly or in admixture of plural kinds thereof. A content of the sultone in the electrolytic solution is, for example, 0.5% by weight or more and not more than 5% by weight.

Also, examples of the additive include acid anhydrides. Examples of the acid anhydride include carboxylic acid anhydrides (for example, succinic anhydride, glutaric anhydride, maleic anhydride, etc.); disulfonic acid anhydrides (for example, ethanedisulfonic anhydride, propanedisulfonic anhydride, etc.); and anhydrides of a carboxylic acid and a sulfonic acid (for example, sulfobenzoic anhydride, sulfopropionic anhydride, sulfobutyric anhydride, etc.). Of these, succinic anhydride and sulfobenzoic anhydride are preferable. These compounds may be used singly or in admixture of plural kinds thereof. A content of the acid anhydride in the electrolytic solution is, for example, 0.5% by weight or more and not more than 5% by weight.

This secondary battery is, for example, manufactured according to the following procedures.

The positive electrode 33 is first prepared. First of all, in the case of forming a film of the compound represented by the formula (I) on the surface, an aqueous solution of this compound is added to a positive electrode active material, and the mixture is dried while stirring, whereby a film of the compound represented by the formula (I) can be formed on the surface of the active material. This positive electrode active material is mixed with a binder and a conductive agent to form a positive electrode mixture, which is then dispersed in an organic solvent to form a positive electrode mixture slurry in a paste form. Subsequently, the positive electrode mixture slurry is uniformly coated on the both surfaces of the positive electrode collector 33A by a doctor blade, a bar coater or the like, followed by drying. Finally, the coating film is subjected to compression molding by a roll press or the like while heating, if desired, thereby forming the positive electrode active material layer 33B. In that case, the compression molding may be repeated plural times. Also, an untreated active material is used and subjected to compression molding to form the positive electrode active material layer 33B, which is then dipped in and coated with an aqueous solution of the compound (I) and dried. There can be thus formed a film on the electrode.

Subsequently, the negative electrode 34 is prepared. First of all, the negative electrode collector 34A made of an electrolytic copper foil or the like is prepared, and a negative electrode material is then deposited on the both surfaces of the electrode collector 34A by a vapor phase process such as a vapor deposition process, thereby forming plural negative electrode active material particles. Subsequently, if desired, an oxide-containing film is formed by a liquid phase process such as a liquid phase deposition process, or a metal material is formed by a liquid phase process such as an electrolytic plating process, thereby forming the negative electrode active material layer 34B.

Subsequently, the positive electrode lead 31 is installed in the positive electrode collector 33A by means of welding, etc., and the negative electrode lead 32 is also installed in the negative electrode collector 34A by means of welding, etc. Thereafter, the positive electrode 33 and the negative electrode 34 are laminated via the separator 35 and then wound in a longitudinal direction to prepare the wound electrode body 30.

Assembling of a secondary battery is carried out in the following manner. First of all, a tip of the positive electrode lead 31 is welded to the safety valve mechanism 15; and a tip of the negative electrode lead 32 is also welded to the battery can 11. Subsequently, the wound electrode body 30 is housed in the inside of the battery can 11 while being interposed between a pair of the insulating plates 12 and 13. Subsequently, an electrolytic solution is injected into the inside of the battery can 11 and impregnated in the separator 35. Finally, the battery lid 14, the safety valve mechanism 15 and the temperature coefficient element 16 are fixed to the open end of the battery can 11 via the gasket 17 by caulking. There is thus completed the secondary battery shown in FIGS. 1 and 2.

In this secondary battery, when charge is carried out, for example, a lithium ion is deintercalated from the positive electrode 33 and intercalated into the negative electrode 34 via the electrolytic solution impregnated in the separator 35. On the other hand, when discharge is carried out, for example, a lithium ion is deintercalated from the negative electrode 34 and intercalated into the positive electrode 33 via the electrolytic solution impregnated in the separator 35.

According to this secondary battery of a cylinder type, since the positive electrode has the same configuration as the foregoing positive electrode, the chemical stability of the positive electrode is enhanced. According to this, since a lithium ion is easily intercalated and deintercalated in the positive electrode, the battery resistance can be suppressed. In that case, the film is formed by using a solution containing the foregoing compound, and specifically, a simple treatment such as a dipping treatment and a coating treatment is adopted, and therefore, the film 34C with good properties can be formed simply.

(Second Secondary Battery)

Figure 8:
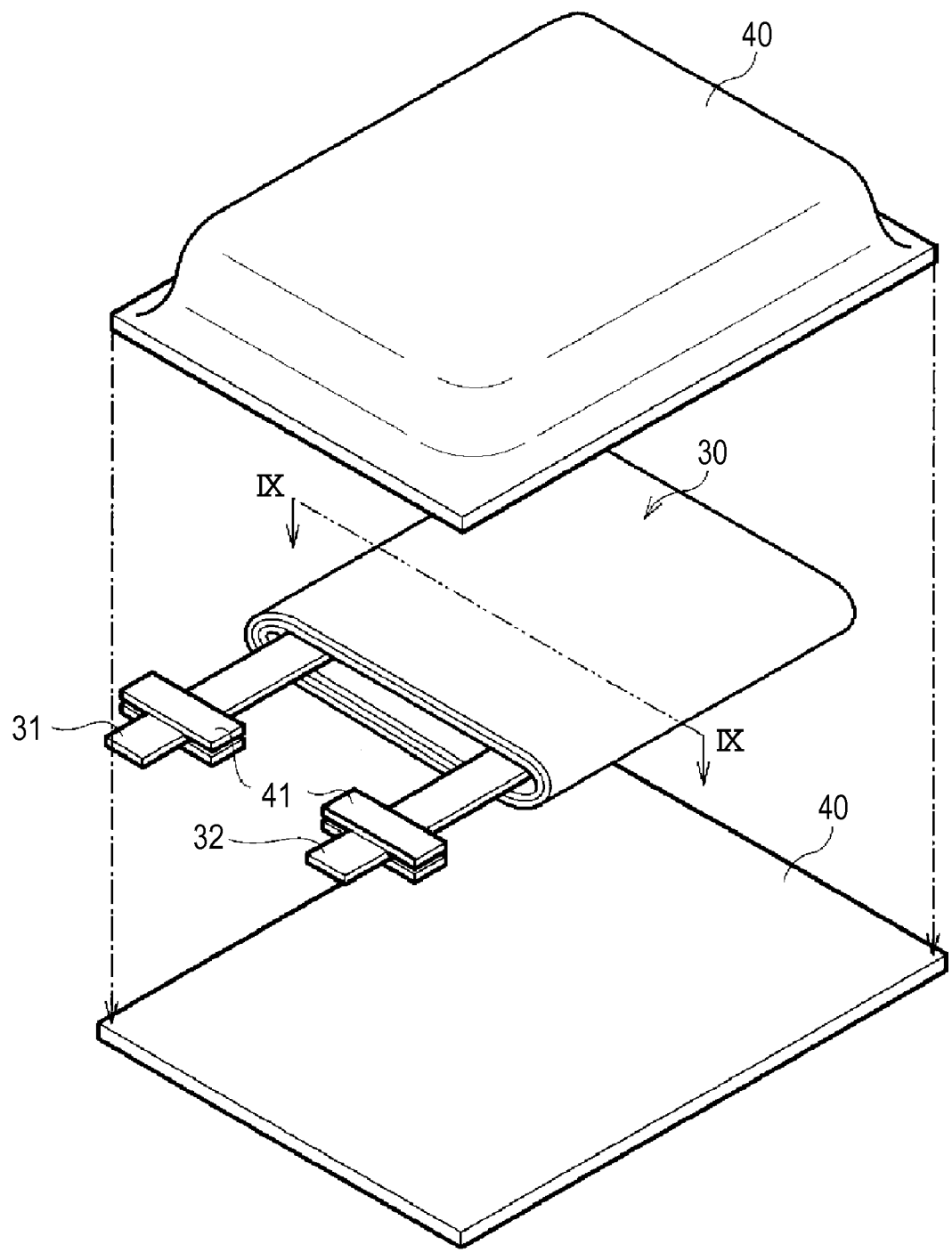
FIG. 8 is an exploded perspective view showing a configuration of a second battery according to an embodiment.

FIG. 8 shows an exploded perspective configuration of a second secondary battery.

This secondary battery is, for example, a lithium ion secondary battery similar to the foregoing first secondary battery and is chiefly one in which a wound electrode body 30 having a positive electrode lead 31 and a negative electrode lead 32 installed therein is housed in the inside of an exterior member 40 in a film form. The battery structure using this exterior member 40 in a film form is called a laminated film type.

The positive electrode lead 31 and the negative electrode lead 32 are each led out in, for example, the same direction from the inside toward the outside of the exterior member 40. The positive electrode lead 31 is made of a metal material, for example, aluminum, etc., and the negative electrode lead 32 is made of a metal material, for example, copper, nickel, stainless steel, etc. Such a metal material is formed in a thin plate state or network state.

The exterior member 40 is made of, for example, an aluminum laminated film obtained by sticking a nylon film, an aluminum foil and a polyethylene film in this order. For example, this exterior member 40 has a structure in which the respective outer edges of the two rectangular aluminum laminated films are allowed to adhere to each other by means of fusion or with an adhesive such that the polyethylene film is disposed opposing to the wound electrode body 30.

A contact film 41 is inserted between the exterior member 40 and each of the positive electrode lead 31 and the negative electrode lead 32 for the purpose of preventing invasion of the outside air. This contact film 41 is made of a material having adhesion to the positive electrode lead 31 and the negative electrode lead 32. Examples of such a material include polyolefin resins such as polyethylene, polypropylene, modified polyethylene and modified polypropylene.

The exterior member 40 may be made of a laminated film having other laminated structure, a polymer film such as polypropylene or a metal film in place of the foregoing aluminum laminated film.

The wound electrode body 30 is one prepared by laminating a positive electrode 33 and a negative electrode 34 via a separator 35 and an electrolyte 36 and winding the laminate, and an outermost peripheral part thereof is protected by a protective tape 37.

A part of the wound electrode body 30 shown in FIG. 8 is shown enlargedly in FIG. 3. The positive electrode 33 is, for example, one in which a positive electrode active material layer 33B is provided on the both surfaces of a positive electrode collector 33A having a pair of surfaces. The negative electrode 34 is, for example, one in which a negative electrode active material layer 34B and a film 34C are provided on the both surfaces of a negative electrode collector 34A having a pair of surfaces. The configuration of each of the positive electrode collector 33A, the positive electrode active material layer 33B, the negative electrode collector 34A, the negative electrode active material layer 34B, the film 34C and the separator 35 is the same as the configuration of each of the positive electrode collector 33A, the positive electrode active material layer 33B, the negative electrode collector 34A, the negative electrode active material layer 34B, the film 34C and the separator 35 in the foregoing first secondary battery.

The electrolyte 36 is a so-called gel electrolyte, which contains an electrolytic solution and a polymer compound for holding this electrolytic solution therein. The gel electrolyte is preferable because not only high ionic conductivity (for example, 1 mS/cm or more at room temperature) is obtained, but the liquid leakage is prevented.

Examples of the polymer compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubbers, nitrile-butadiene rubbers, polystyrene and polycarbonates. These compounds may be used singly or in admixture of plural kinds thereof. Of these, polyacrylonitrile, polyvinylidene fluoride, polyhexafluoropropylene and polyethylene oxide. This is because these compounds are electrochemically stable.

A composition of the electrolytic solution is the same as the composition of the electrolytic solution in the first secondary battery. However, in that case, the solvent has a broad concept including not only a liquid solvent but a solvent with ionic conductivity such that it is able to dissociate the electrolyte salt. Accordingly, in the case of using a polymer compound with ionic conductivity, the subject polymer compound is also included in the solvent.

In place of the electrolyte 36 in a gel form, in which an electrolytic solution is held in a polymer compound, the electrolytic solution may be used as it is. In that case, the electrolytic solution is impregnated in the separator 35.

The secondary battery provided with the electrolyte 36 in a gel form is manufactured by the following three kinds of methods.

In a first manufacturing method, first of all, for example, not only the positive electrode active material layer 33B is formed on the both surfaces of the positive electrode collector 33A to form the positive electrode 33, but the negative electrode active material layer 34B and the film 34C are formed on the both surfaces of the negative electrode collector 34A according to the same procedures as the preparation procedures of the positive electrode 33 and the negative electrode 34 in the foregoing first secondary battery. Subsequently, a precursor solution containing an electrolytic solution, a polymer compound and a solvent is prepared and coated on each of the positive electrode 33 and the negative electrode 34, and the solvent is then vaporized to form the electrolyte 36 in a gel form. Subsequently, the positive electrode lead 31 is installed in the positive electrode collector 33A, and the negative electrode lead 32 is also installed in the negative electrode collector 34A. Subsequently, the positive electrode 33 and the negative electrode 34 each having the electrolyte 36 formed thereon are laminated via the separator 35, the laminate is then wound in a longitudinal direction thereof, and the protective tape 37 is allowed to adhere to the outermost peripheral part to form the wound electrode body 30. Finally, for example, the wound electrode body 30 is interposed between the two exterior members 40 in a film form, and the outer edges of the exterior members 40 are allowed to adhere to each other by means of heat fusion, etc., thereby sealing the wound electrode body 30. On that occasion, the contact film 41 is inserted between each of the positive electrode lead 31 and the negative electrode lead 32 and the exterior member 40. According to this, the secondary battery shown in FIG. 8 is completed.

In a second manufacturing method, first of all, the positive electrode lead 31 is installed in the positive electrode 33, and the negative electrode lead 32 is also installed in the negative electrode 34; the positive electrode 33 and the negative electrode 34 are then laminated via the separator 35 and wound; and the protective tape 37 is allowed to adhere to the outermost peripheral part, thereby forming a wound body serving as a precursor of the wound electrode body 30. Subsequently, the wound body is interposed between the two exterior members 40 in a film form, and the outer edges exclusive of one side are allowed to adhere to each other by means of heat fusion, etc. and then housed in the inside of the exterior member 40 in a bag form. Subsequently, a composition for electrolyte containing an electrolytic solution, a monomer as a raw material of the polymer compound, a polymerization initiator and optionally other materials such as a polymerization inhibitor is prepared and injected into the inside of the exterior member 40 in bag form. Thereafter, an opening of the exterior member 40 is hermetically sealed by means of heat fusion, etc. Finally, the monomer is heat polymerized to form a polymer compound, thereby forming the electrolyte 36 in a gel form. There is thus completed the secondary battery.

In a third manufacturing method, first of all, a wound body is formed in the same manner as in the foregoing second manufacturing method, except for using the separator 35 having a polymer compound coated on the both surfaces thereof, and then housed in the inside of the exterior member 40 in a bag form. Examples of the polymer compound which is coated on this separator 35 include polymers composed of, as a component, vinylidene fluoride, namely a homopolymer, a copolymer or a multi-component copolymer. Specific examples thereof include polyvinylidene fluoride; a two-component based copolymer composed of, as components, vinylidene fluoride and hexafluoropropylene; and a three-component based copolymer composed of, as components, vinylidene fluoride, hexafluoropropylene and chlorotrifluoroethylene. The polymer compound may contain one or two or more kinds of other polymer compounds together with the foregoing polymer composed of, as a component, vinylidene fluoride. Subsequently, an electrolytic solution is prepared and injected into the inside of the exterior member 40, and an opening of the exterior member 40 is then hermetically sealed by means of heat fusion, etc. Finally, the separator 35 is brought into contact with the positive electrode 33 and the negative electrode 34 via the polymer compound upon heating while adding a weight to the exterior member 40. According to this, the electrolytic solution is impregnated in the polymer compound, and the polymer compound is gelled to form the electrolyte 36. There is this completed the secondary battery.

In this third manufacturing method, expansion of the secondary battery is suppressed as compared with the first manufacturing method. Also, in the third manufacturing method, the monomer as a raw material of the polymer compound, the solvent and the like do not substantially remain in the electrolyte 36 as compared with the second manufacturing method, and the forming step of a polymer compound is controlled well. Accordingly, sufficient adhesion between each of the positive electrode 33 and the negative electrode 34 and each of the separator 35 and the electrolyte 36 is obtained. According to this secondary battery of a laminated film type, since the positive electrode has the same configuration as in the foregoing positive electrode, the cycle characteristic can be enhanced. Other effects regarding this secondary battery are the same as those in the first secondary battery.

EXAMPLES

The compound (I) used in the Examples is shown below.

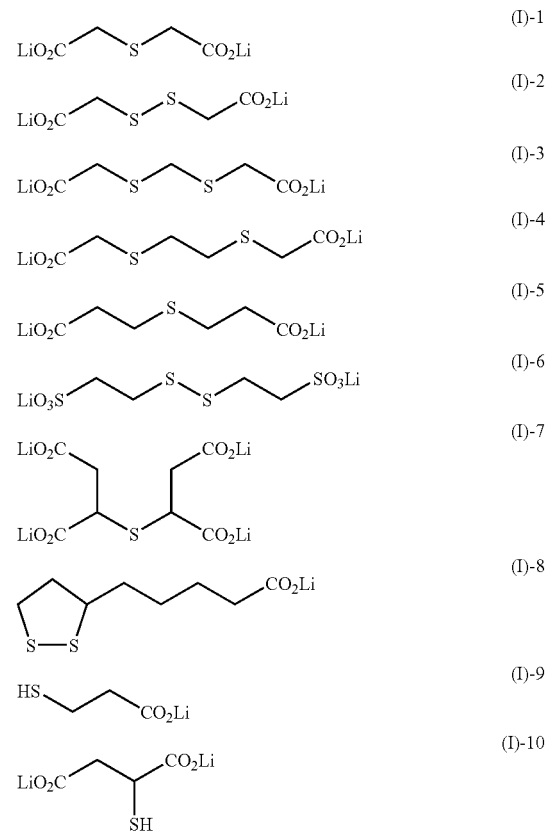

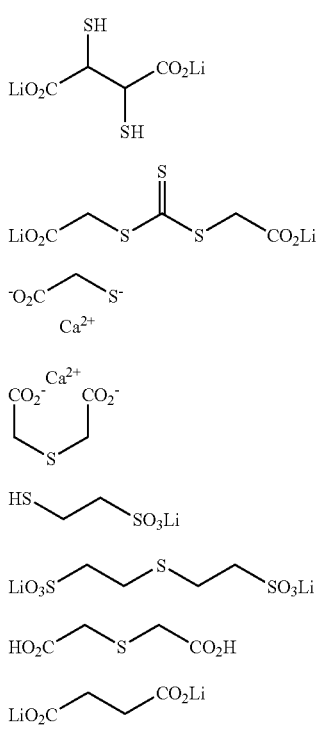

Compound (I)-1: Dilithium thiodiglycolate
Compound (I)-2: Dilithium dithiodiglycolate
Compound (I)-3: Methylene bis(dilithium thioglycolate)
Compound (I)-4: Ethylene bis(dilithium thioglycolate)
Compound (I)-5: Dilithium thiodipropionate
Compound (I)-6: Dilithium dithiodipropionate
Compound (I)-7: Tetralithium thiodisuccinate
Compound (I)-8: DL-(x-Lipoic acid lithium
Compound (I)-9: Lithium thioglycolate
Compound (I)-10: Lithium thiomalate
Compound (I)-11: Dilithium, 2,3-dimercaptosuccinate
Compound (I)-12: Trithiocarbonic acid bis(lithium acetate)
Compound (I)-13: Calcium thioglycolate
Compound (I)-14: Calcium thiodiglycolate
Compound (I)-15: Lithium mercaptoethanesulfonate
Compound (I)-16: Lithium thiodiethanesulfonate
Compound 17: Thioglycolic acid (comparison)
Compound 18: Dilithium succinate (comparison)

Examples 1-1 to 1-16 and Comparative Examples 1-1 to 1-3

Example 1-1

A secondary battery of a laminated film type was prepared according to the following procedures.

The positive electrode 33 was first prepared. First of all, lithium carbonate ($Li_2CO_3$) and cobalt carbonate ($CoCO_3$) were mixed in a molar ratio of 0.5/1 and then baked in air under a condition of 900° C.×5 hours to obtain a lithium cobalt complex oxide ($LiCoO_2$). Subsequently, 91 parts by mass of the lithium cobalt complex oxide as a positive electrode active material, 6 parts by mass of graphite as a conductive agent and 3 parts by mass of polyvinylidene fluoride as a binder were mixed to form a positive electrode mixture, which was then dispersed in N-methyl-2-pyrrolidone to prepare a positive electrode mixture slurry in a paste form. Subsequently, the positive electrode mixture slurry was uniformly coated on the both surfaces of the positive electrode collector 33A made of a strip-shaped aluminum foil (thickness: 12 μm) by a bar coater, dried and then subjected to compression molding by a roll press, thereby forming the positive electrode active material layer 33B.

Subsequently, the negative electrode 34 was prepared. First of all, the negative electrode collector 34A made of an electrolytic copper foil (thickness: 10 μm) was prepared, and silicon as a negative electrode active material was deposited in a thickness of 7 μm on the both surfaces of the negative electrode collector 34A by an electron beam vapor deposition process, thereby forming plural negative electrode active material particles. There was thus formed the negative electrode active material layer 34B. On that occasion, the charge capacity by the negative electrode active material was regulated at a level larger than the charge capacity of the positive electrode such that a lithium metal was not deposited on the negative electrode on the way of charge. Subsequently, a 3 wt % aqueous solution of the metal salt expressed by Compound (I)-1 was prepared, and thereafter, the negative electrode collector 34A having the negative electrode active material layer 34B formed thereon was dipped in the solution for several seconds. Finally, the negative electrode collector 34A was lifted up from the solution and then dried in a vacuum atmosphere at 60° C., thereby forming the film 34C on the negative electrode active material layer 34B.

Subsequently, ethylene carbonate (EC) and diethyl carbonate (DEC) were mixed as a solvent, into which was then dissolved lithium hexafluorophosphate ($LiPF_6$) as an electrolyte salt, thereby preparing an electrolytic solution. On that occasion, a composition of the solvent (EC/DEC) was regulated at 30/70 in terms of a weight ratio, and a concentration of lithium hexafluorophosphate in the electrolytic solution was regulated at 1 mole/kg.

Finally, a secondary battery was assembled by using the electrolytic solution together with the positive electrode 33 and the negative electrode 34. First of all, the positive electrode lead 31 made of aluminum was welded to one end of the positive electrode collector 33A, and the negative electrode lead 32 made of nickel was also welded to one end of the negative electrode collector 34A. Subsequently, the positive electrode 33, the separator 35 made of a microporous polypropylene film (thickness: 25 μm) and the negative electrode 34 were laminated in this order, the laminate was wound in a longitudinal direction, and an end portion of winding was then fixed by the protective tape 37 made of an adhesive tape, thereby forming a wound body which is a precursor of the wound electrode body 30. Subsequently, the wound body was interposed within the exterior member 40 made of a three-layered laminated film having a nylon film (thickness: 30 μm), an aluminum foil (thickness: 40 μm) and a non-stretched polypropylene film (thickness: 30 μm) laminated therein (total thickness: 100 μm) from the outside, and thereafter, the outer edges exclusive of one side were heat fused to each other and then housed in the inside of the exterior member 40 in a bag form. Subsequently, an electrolytic solution was injected from an opening of the exterior member 40 and impregnated in the separator 35, thereby preparing the wound electrode body 30. Finally, the opening of the exterior member 40 was sealed by means of heat fusion in a vacuum atmosphere, thereby completing a secondary battery of a laminated film type.

In examining the cycle characteristic, charge and discharge with two cycles were carried out in an atmosphere at 23° C., thereby measuring the discharge capacity; subsequently, charge and discharge were carried out in the same atmosphere until the total sum of cycle number reached 100 cycles, thereby measuring the discharge capacity; and thereafter, a discharge capacity retention rate (%)={(discharge capacity at the 100th cycle)/(discharge capacity at the 2nd cycle)}×100 was calculated. On that occasion, with respect to the charge and discharge condition with one cycle, charge was carried out at a constant current density of 1 mA/cm$^2$ until the battery voltage reached 4.2 V; charge was further carried out at a constant voltage of 4.2 V until the current density reached 0.02 mA/cm$^2$; and thereafter, discharge was carried out at a constant current density of 1 mA/cm$^2$ until the battery voltage reached 2.5 V.

Examples 1-2 to 1-16

The same procedures as in Example 1-1 were followed, except for providing a film made of each of Compounds (I)-2 to (I)-16 in place of the Compound (I)-1.

Comparative Example 1-1

The same procedures as in Example 1-1 were followed, except for not providing a film.

Comparative Examples 1-2 and 1-3

The same procedures as in Example 1-1 were followed, except for providing a film made of each of Compounds (I)-17 and (I)-18 in place of the Compound (I)-1.

The results of the cycle characteristic are shown in Table 1. As compared with Comparative Example 1-1 in which a film was not provided, the cycle characteristic was enhanced in all of the cases of Examples 1-1 to 1-16. Above all, Compounds (I)-1 to (I)-7, Compound (I)-10, Compound (I)-11 and Compounds (I)-13 to (I)-16 are preferable, and Compounds (I)-7 and Compounds (I)-13 to (I)-16 are especially preferable. It may be considered that this is caused due to the fact that the film is hardly dissolved in the electrolytic solution.

There is a tendency that when the number of the carboxylic acid or sulfonic acid salt increases, the cycle characteristic is enhanced.

For example, in comparison between Compound (I)-9 and Compound (I)-10, Compound (I)-10 is preferable. It may be considered that this is caused due to the fact that when the number of the carboxylic acid salt increases, the solubility is lowered. The same is also applicable in comparison among Compound (I)-1, Compound (1)-5 and Compound (I)-7.

Also, the sulfonic acid salt is more preferable than the carboxylic acid salt. In comparison between Compound (I)-9 and Compound (I)-15, Compound (I)-15 is more enhanced in the cycle characteristic, and therefore, the effect to be brought by the sulfonic acid salt is higher than that to be brought by the carboxylic acid salt the solubility is lowered.

In comparison between the alkali metal salt and the alkaline earth metal salt, the alkaline earth metal salt is more preferable. In comparison between Compound (I)-1 and Compound (I)-14, Compound (I)-14 is more enhanced in the cycle characteristic. It may be considered that this is caused due to the fact that the alkaline earth metal salt is lower in solubility than the alkali metal salt.

TABLE 1

Silicon negative electrode (by vapor deposition)

| | Solvent | Compound used in coating layer | Discharge capacity retention rate (%) |
|---|---|---|---|
| Example 1-1 | EC/DEC = 3/7 | Compound (I)-1 | 65 |
| Example 1-2 | | Compound (I)-2 | 66 |
| Example 1-3 | | Compound (I)-3 | 62 |
| Example 1-4 | | Compound (I)-4 | 64 |
| Example 1-5 | | Compound (I)-5 | 66 |
| Example 1-6 | | Compound (I)-6 | 67 |
| Example 1-7 | | Compound (I)-7 | 70 |
| Example 1-8 | | Compound (I)-8 | 50 |
| Example 1-9 | | Compound (I)-9 | 53 |
| Example 1-10 | | Compound (I)-10 | 65 |
| Example 1-11 | | Compound (I)-11 | 65 |
| Example 1-12 | | Compound (I)-12 | 56 |
| Example 1-13 | | Compound (I)-13 | 71 |
| Example 1-14 | | Compound (I)-14 | 72 |
| Example 1-15 | | Compound (I)-15 | 69 |
| Example 1-16 | | Compound (I)-16 | 72 |
| Comparative Example 1-1 | | Nil | 29 |
| Comparative Example 1-2 | | Compound (I)-17 | 30 |
| Comparative Example 1-3 | | Compound (I)-18 | 38 |

Examples 2-1 to 2-16 and Comparative Example 2-1 to 2-2

Examples 2-1 to 2-8

The same procedures as in Example 1-1 were followed, except for using a mixture of FEC/DEC (3/7) in the electrolytic solution. Films using, as the compound of the film, Compound (I)-1, Compound (I)-2, Compound (I)-4, Compound (I)-5, Compound (I)-7, Compound (I)-9, Compound (I)-13 and Compound (I)-16, respectively were provided.

Examples 2-9 to 2-16

The same procedures as in Example 1-1 were followed, except for using a mixture of PC/FEC/DFEC/DEC (1/1/1/7) in the electrolytic solution. Films using, as the compound of the film, Compound (I)-1, Compound (I)-2, Compound (I)-4, Compound (I)-5, Compound (I)-7, Compound (I)-9, Compound (I)-13 and Compound (I)-15, respectively were provided.

Comparative Examples 2-1 and 2-2

The same procedures as in Examples 2-1 and 2-9 were followed, respectively, except for not providing a film.

The results of the cycle characteristic are shown in Table 2. In the case of using a mixture of FEC/DEC (3/7) or a mixture of PC/FEC/DFEC/DEC (1/1/1/7) in the electrolytic solution, the same results as in Table 1 were obtained. In the case of not providing a film, in comparison between Comparative Example 2-1 and Comparative Example 2-2, the cycle characteristic was also enhanced in the case of using any of the solvents.

TABLE 2

Silicon negative electrode (by vapor deposition);
FEC and DFEC solvents

| | Solvent | Compound used in coating layer | Discharge capacity retention rate (%) |
|---|---|---|---|
| Example 2-1 | FEC/DEC = 3/7 | Compound (I)-1 | 83 |
| Example 2-2 | | Compound (I)-2 | 85 |
| Example 2-3 | | Compound (I)-4 | 85 |
| Example 2-4 | | Compound (I)-5 | 85 |
| Example 2-5 | | Compound (I)-7 | 89 |
| Example 2-6 | | Compound (I)-9 | 76 |
| Example 2-7 | | Compound (I)-13 | 89 |
| Example 2-8 | | Compound (I)-15 | 86 |
| Example 2-9 | PC/FEC/DFEC/ | Compound (I)-1 | 84 |
| Example 2-10 | DEC = 1/1/1/7 | Compound (I)-2 | 85 |
| Example 2-11 | | Compound (I)-4 | 86 |
| Example 2-12 | | Compound (I)-5 | 85 |

TABLE 2-continued

Silicon negative electrode (by vapor deposition);
FEC and DFEC solvents

| | Solvent | Compound used in coating layer | Discharge capacity retention rate (%) |
|---|---|---|---|
| Example 2-13 | | Compound (I)-7 | 89 |
| Example 2-14 | | Compound (I)-9 | 78 |
| Example 2-15 | | Compound (I)-13 | 89 |
| Example 2-16 | | Compound (I)-15 | 87 |
| Comparative Example 2-1 | FEC/DEC = 3/7 | Nil | 66 |
| Comparative Example 2-2 | PC/FEC/DFEC/ DEC = 1/1/1/7 | Nil | 67 |

Examples 3-1 to 3-4 and Comparative Examples 3-1 to 3-4

Examples 3-1 to 3-4

The same procedures as in Example 2-4 were followed, except for further adding 1 wt % of other additive (vinylene carbonate, propene sultone, succinic anhydride and 2-sulfobenzoic anhydride, respectively) to the electrolytic solution. A film made of Compound (I)-5 was provided in the negative electrode.

Comparative Examples 3-1 to 3-4

The same procedures as in Examples 3-1 to 3-4 were followed, respectively, except for not providing the film made of Compound (I)-5.

The results are shown in Table 3. It was noted that even in the case of adding other additive to the electrolytic solution, the cycle characteristic was more enhanced.

TABLE 3

Silicon negative electrode (by vapor deposition); joint use with other additive

| | Solvent | Compound used in coating layer | Other additive | Discharge capacity retention rate (%) |
|---|---|---|---|---|
| Example 3-1 | FEC/DEC = 3/7 | Compound (I)-5 | Vinylene carbonate: 1 wt % | 89 |
| Example 3-2 | | Compound (I)-5 | Propene sultone: 1 wt % | 83 |
| Example 3-3 | | Compound (I)-5 | Succinic anhydride: 1 wt % | 87 |
| Example 3-4 | | Compound (I)-5 | 2-Sulfobenzoic anhydride: 1 wt % | 86 |
| Comparative Example 2-1 | FEC/DEC = 3/7 | Nil | Nil | 66 |
| Example 2-4 | | Compound (I)-5 | Nil | 85 |
| Comparative Example 3-1 | | Nil | Vinylene carbonate: 1 wt % | 73 |
| Comparative Example 3-2 | | Nil | Propene sultone: 1 wt % | 64 |
| Comparative Example 3-3 | | Nil | Succinic anhydride: 1 wt % | 68 |
| Comparative Example 3-4 | | Nil | 2-Sulfobenzoic anhydride: 1 wt % | 67 |

Examples 4-1 to 4-4 and Comparative Examples 4-1 to 4-4

Examples 4-1 to 4-4

The same procedures as in Example 2-4 were followed, except for adding, as the electrolyte salt, 0.9 moles/kg of $LiPF_6$ and 0.1 moles/kg of other additive ($LiBF_4$, LiBOB, LiTFSI and cyclic imide, respectively). A film made of Compound (I)-5 was provided in the negative electrode.

Comparative Examples 4-1 to 4-4

The same procedures as in Examples 4-1 to 4-4 were followed, respectively, except for not providing the film made of Compound (I)-5.

The results are shown in Table 4. It was noted that even in the case of adding other electrolyte to the electrolytic solution, the cycle characteristic was more enhanced.

TABLE 4

Silicon negative electrode (by vapor deposition); combination with other electrolyte salt

| | Solvent | Compound used in coating layer | Electrolyte salt | Discharge capacity retention rate (%) |
|---|---|---|---|---|
| Example 4-1 | FEC/DEC = 3/7 | Compound (I)-5 | $LiPF_6$: 0.9 moles/kg $LiBF_4$: 0.1 moles/kg | 86 |
| Example 4-2 | | Compound (I)-5 | $LiPF_6$: 0.9 moles/kg LiBOB: 0.1 moles/kg | 87 |
| Example 4-3 | | Compound (I)-5 | $LiPF_6$: 0.9 moles/kg LiTFSI: 0.1 moles/kg | 88 |
| Example 4-4 | | Compound (I)-5 | $LiPF_6$: 0.9 moles/kg Cyclic imide: 0.1 moles/kg | 87 |
| Comparative Example 2-1 | FEC/DEC = 3/7 | Nil | Nil | 66 |
| Example 2-4 | | Compound (I)-5 | Nil | 85 |
| Comparative Example 4-1 | | Nil | $LiPF_6$: 0.9 moles/kg $LiBF_4$: 0.1 moles/kg | 65 |
| Comparative Example 4-2 | | Nil | $LiPF_6$: 0.9 moles/kg LiBOB: 0.1 moles/kg | 67 |
| Comparative Example 4-3 | | Nil | $LiPF_6$: 0.9 moles/kg LiTFSI: 0.1 moles/kg | 67 |
| Comparative Example 4-4 | | Nil | $LiPF_6$: 0.9 moles/kg Cyclic imide: 0.1 moles/kg | 66 |

Examples 5-1 to 5-3 and Comparative Examples 5-1 to 5-3

Example 5-1

In the case of forming the negative electrode active material layer 34B, the same procedures as in Example 2-4 were followed, except that after forming plural negative electrode active material particles, silicon oxide (SiO2) was deposited as an oxide-containing film on the surface of the negative electrode active material particle by a liquid phase deposition process. In the case of forming this oxide-containing film, the negative electrode collector 34A having a negative electrode active material particle formed thereon was dipped in a solution having boron as an anion scavenger dissolved in fluorosilicic acid for 3 hours to deposit silicon oxide on the surface of the negative electrode active material particle, washed with water and then dried. Thereafter, the resulting negative electrode collector 34A was dipped in an aqueous solution of Compound (I)-5, thereby forming a coating layer. The same procedures as in Example 2-4 were followed, except for preparing a negative electrode in this way.

Example 5-2

In the case of forming the negative electrode active material layer 34B, the same procedures as in Example 2-4 were followed, except that after forming plural negative electrode active material particles, a plated film of cobalt (Co) as a metal material was grown by an electrolytic plating process. In the case of forming this metal material, an electric current was passed while supplying air into a plating bath, thereby depositing cobalt on the both surfaces of the negative electrode collector 34A. On that occasion, a cobalt plating solution, manufactured by Japan Pure Chemical Co., Ltd. was used as a plating solution, a current density was regulated at from 2 A/dm² to 5 A/dm², and a plating rate was regulated at 10 nm/sec. Thereafter, the resulting negative electrode collector 34A was dipped in an aqueous solution of Compound (I)-5, thereby forming a coating layer. The same procedures as in Example 2-4 were followed, except for preparing a negative electrode in this way.

Example 5-3

In the case of forming the negative electrode active material layer 34B, the same procedures as in Example 2-4 were followed, except that after forming plural negative electrode active material particles, silicon oxide (SiO2) was deposited as an oxide-containing film on the surface of the negative electrode active material particle by a liquid phase deposition process, and a plated film of cobalt (Co) as a metal material was then grown by an electrolytic plating process. An oxide film and a plated film were prepared in the same manners as in Example 5-1 and Example 5-2, respectively. Thereafter, the resulting negative electrode collector 34A was dipped in an aqueous solution of Compound (I)-5, thereby forming a coating layer. The same procedures as in Example 2-4 were followed, except for preparing a negative electrode in this way.

Comparative Examples 5-1 to 5-3

The same procedures as in Examples 5-1 to 5-3 were followed, respectively, except for not providing the film.

The results are shown in Table 5. It was noted that by previously forming other film on the negative electrode active material layer and then forming the film made of Compound (I)-5, the cycle characteristic was more enhanced.

TABLE 5

Silicon negative electrode (by vapor deposition);
combination with other surface treatment

| | Solvent | Previously formed film | Compound used in coating layer | Discharge capacity retention rate (%) |
|---|---|---|---|---|
| Example 5-1 | FEC/DEC = 3/7 | SiO$_2$ | Compound (I)-5 | 90 |
| Example 5-2 | | Co plating | Compound (I)-5 | 90 |
| Example 5-3 | | SiO$_2$ + Co plating | Compound (I)-5 | 91 |
| Comparative Example 2-1 | FEC/DEC = 3/7 | | Nil | 66 |
| Example 2-4 | | Nil | Compound (I)-5 | 85 |
| Comparative Example 5-1 | | SiO$_2$ | Nil | 88 |
| Comparative Example 5-2 | | Co plating | Nil | 88 |
| Comparative Example 5-3 | | SiO$_2$ + Co plating | Nil | 89 |

Examples 6-1 to 6-8 and Comparative Example 6-1

Examples 6-1 to 6-8

The same procedures as in Examples 1-1, 1-2, 1-4, 1-5, 1-7, 1-9, 1-13 and 1-15 were followed, respectively, except for forming the negative electrode active material layer 34B by a sintering process in place of the vapor phase process (electron beam vapor deposition process). In the case of forming the negative electrode active material layer 34B by a sintering process, a negative electrode mixture prepared by mixing 95 parts by mass of silicon (average particle size: 1 μm) as a negative electrode active material and 5 parts by mass of polyimide as a binder was dispersed in N-methyl-2-pyrrolidone to form a negative electrode mixture slurry in a paste form, which was then uniformly coated on the both surfaces of the negative electrode collector 34A made of an electrolytic copper foil (thickness: 18 μm) by a bar coater and then dried; and the resulting negative electrode collector 34A was subjected to compression molding by a roll press and heated under a condition of 400° C.×12 hours in a vacuum atmosphere.

Comparative Example 6-1

The same procedures as in Examples 6-1 were followed, except for not providing the film.
The results are shown in Table 6. It was noted that even in the case of forming a negative electrode active material layer by a sintering process, the cycle characteristic was enhanced.

TABLE 6

Silicon negative electrode (by sintering)

| | Solvent | Compound used in coating layer | Discharge capacity retention rate (%) |
|---|---|---|---|
| Example 6-1 | EC/DEC = 3/7 | Compound (I)-1 | 55 |
| Example 6-2 | | Compound (I)-2 | 56 |
| Example 6-3 | | Compound (I)-4 | 56 |
| Example 6-4 | | Compound (I)-5 | 56 |
| Example 6-5 | | Compound (I)-7 | 46 |
| Example 6-6 | | Compound (I)-9 | 61 |
| Example 6-7 | | Compound (I)-13 | 63 |
| Example 6-8 | | Compound (I)-15 | 60 |
| Comparative Example 6-1 | EC/DEC = 3/7 | Nil | 25 |

Examples 7-1 to 7-8 and Comparative Example 7-1

Examples 7-1 to 7-8

The same procedures as in Examples 6-1 to 6-8 were followed, respectively, except for using a CoSnC alloy as the negative electrode.

A tin/cobalt/indium/titanium alloy powder and a carbon powder were mixed, from which was then synthesized a CoSnC-containing material while utilizing a mechanochemical reaction. The analysis of a composition of this CoSnC-containing material revealed that a content of tin was 48% by mass, a content of cobalt was 23% by mass, a content of carbon was 20% by mass, and a proportion of cobalt to the total sum of tin and cobalt (Co/(Sn+Co)) was 32% by mass. Subsequently, 80 parts by mass of the foregoing CoSnC-containing material powder as a negative electrode active material, 12 parts by mass of graphite as a conductive agent and 8 parts by mass of polyvinylidene fluoride as a binder were mixed, and the mixture was dispersed in N-methyl-2-pyrrodilone as a solvent. Finally, the dispersion was coated on the negative electrode collector 34A made of a copper foil (thickness: 15 μm) and dried, followed by compression molding to form the negative electrode active material layer 34B.

Comparative Example 7-1

The same procedures as in Examples 7-1 were followed, except for not providing the film.
The results are shown in Table 7. It was noted that even in the case of using CoSnC in the negative electrode active material layer, the cycle characteristic was enhanced.

TABLE 7

CoSnC negative electrode

| | Solvent | Compound used in coating layer | Discharge capacity retention rate (%) |
|---|---|---|---|
| Example 7-1 | EC/DEC = 3/7 | Compound (I)-1 | 68 |
| Example 7-2 | | Compound (I)-2 | 69 |
| Example 7-3 | | Compound (I)-4 | 68 |
| Example 7-4 | | Compound (I)-5 | 69 |
| Example 7-5 | | Compound (I)-7 | 61 |
| Example 7-6 | | Compound (I)-9 | 69 |
| Example 7-7 | | Compound (I)-13 | 72 |
| Example 7-8 | | Compound (I)-15 | 70 |

TABLE 7-continued

CoSnC negative electrode

|  | Solvent | Compound used in coating layer | Discharge capacity retention rate (%) |
|---|---|---|---|
| Comparative Example 7-1 | EC/DEC = 3/7 | Nil | 50 |

Examples 8-1 to 8-8 and Comparative Examples 8-1 to 8-3

Examples 8-1 to 8-8

The same procedures as in Examples 6-1 to 6-8 were followed, respectively, except for using graphite as the negative electrode active material. Graphite was used as the negative electrode active material; 97 parts by mass of this graphite and 3 parts by mass of polyvinylidene fluoride as a binder were mixed, to which was then added N-methyl-pyrrolidone; the mixture was uniformly coated on the negative electrode collector 34A made of a copper foil having a thickness of 15 μm and dried to form the negative electrode active material layer 34B; and the coating layer 34C was prepared in the same manner.

Comparative Example 8-1

The same procedures as in Examples 8-1 were followed, except for not providing the film.

Comparative Examples 8-2 and 8-3

The same procedures as in Examples 8-1 were followed, except for using a film made of each of Compounds (I)-17 and (I)-18 in the coating layer.

The results are shown in Table 8. It was noted that even in the case of using graphite in the negative electrode active material layer, the cycle characteristic was enhanced.

TABLE 8

Graphite negative electrode

|  | Solvent | Additive | Compound used in coating layer | Discharge capacity retention rate (%) |
|---|---|---|---|---|
| Example 8-1 | EC/DEC = 3/7 | Nil | Compound (I)-1 | 85 |
| Example 8-2 |  | Nil | Compound (I)-2 | 86 |
| Example 8-3 |  | Nil | Compound (I)-4 | 86 |
| Example 8-4 |  | Nil | Compound (I)-5 | 86 |
| Example 8-5 |  | Nil | Compound (I)-7 | 80 |
| Example 8-6 |  | Nil | Compound (I)-9 | 88 |
| Example 8-7 |  | Nil | Compound (I)-13 | 89 |
| Example 8-8 |  | Nil | Compound (I)-15 | 88 |
| Comparative Example 8-1 | EC/DEC = 3/7 | Nil | Nil | 77 |
| Comparative Example 8-2 |  | Nil | Compound (I)-17 | 76 |
| Comparative Example 8-3 |  | Nil | Compound (I)-18 | 78 |

Examples 9-1 to 9-6 and Comparative Examples 9-1 to 9-6

Examples 9-1 to 9-6

The same procedures as in Example 8-4 were followed, except for further adding 1 wt % of other additive (vinylene carbonate, propene sultone, succinic anhydride and 2-sulfobenzoic anhydride, respectively) to the electrolytic solution. A film made of Compound (I)-5 was provided in the negative electrode.

Comparative Examples 9-1 to 9-6

The same procedures as in Examples 9-1 to 9-6 were followed, respectively, except for not providing the film made of Compound (I)-5.

The results are shown in Table 9. It was noted that even in the case of adding other additive to the electrolytic solution, the cycle characteristic was more enhanced.

TABLE 9

Graphite negative electrode; combination with other additive

|  | Solvent | Additive | Compound used in coating layer | Discharge capacity retention rate (%) |
|---|---|---|---|---|
| Example 9-1 | EC/DEC = 3/7 | Vinylene carbonate: 1 wt % | Compound (I)-5 | 90 |
| Example 9-2 |  | FEC: 1 wt % | Compound (I)-5 | 91 |
| Example 9-3 |  | DFEC: 1 wt % | Compound (I)-5 | 91 |
| Example 9-4 |  | Propene sultone: 1 wt % | Compound (I)-5 | 87 |
| Example 9-5 |  | Succinic anhydride: 1 wt % | Compound (I)-5 | 88 |
| Example 9-6 |  | 2-Sulfobenzoic anhydride: 1 wt % | Compound (I)-5 | 89 |
| Comparative Example 8-1 | EC/DEC = 3/7 | Nil | Nil | 77 |
| Example 8-4 |  | Nil | Compound (I)-5 | 86 |
| Comparative Example 9-1 |  | Vinylene carbonate: 1 wt % | Nil | 86 |
| Comparative Example 9-2 |  | FEC: 1 wt % | Nil | 87 |
| Comparative Example 9-3 |  | DFEC: 1 wt % | Nil | 87 |
| Comparative Example 9-4 |  | Propene sultone: 1 wt % | Nil | 77 |
| Comparative Example 9-5 |  | Succinic anhydride: 1 wt % | Nil | 80 |

TABLE 9-continued

Graphite negative electrode; combination with other additive

| | Solvent | Additive | Compound used in coating layer | Discharge capacity retention rate (%) |
|---|---|---|---|---|
| Comparative Example 9-6 | | 2-Sulfobenzoic anhydride: 1 wt % | Nil | 81 |

Examples 10-1 to 10-4 and Comparative Example 10-1 to 10-2

A secondary battery of a coin type was prepared according to the following procedures. On that occasion, the secondary battery was a lithium ion secondary battery in which the capacity of the negative electrode 34 was expressed on the basis of intercalation and deintercalation of lithium. One part by weight of each of the compounds described below was weighed relative to 100 parts by weight of a lithium cobalt complex oxide ($LiCo_{0.98}Al_{0.01}Mg_{0.01}O_2$) having an average particle size of 13 μm (measured by a laser scattering process), and the mixture was stirred in 100 mL of pure water for one hour. After stirring, the water was removed by an evaporator, followed by drying in an oven at 120° C. for 12 hours. There were thus obtained positive electrode active materials having lithium cobaltate coated with Compound (I)-15, Compound (I)-16 and Compound (I)-11, respectively.

A coin battery as described below was prepared by using each of the thus obtained positive electrode active materials and evaluated for the reaction resistance by an alternate current impedance process as well as the cycle characteristic.

91 parts by mass of the lithium cobalt complex oxide, 6 parts by mass of graphite as a conductive agent and 3 parts by mass of polyvinylidene fluoride as a binder were mixed to form a positive electrode mixture, which was then dispersed in N-methyl-2-pyrrolidone to form a positive electrode mixture slurry in a paste form. Subsequently, the positive electrode mixture slurry was uniformly coated on the both surfaces of the positive electrode collector 33A made of a strip-shaped aluminum foil (thickness: 12 μm) by a bar coater, dried and then subjected to compression molding by a roll press, thereby forming the positive electrode active material layer 33B. Thereafter, the positive electrode active material layer 33B was punched into a pellet having a diameter of 15.5 mm, thereby preparing the positive electrode 33.

With respect to the negative electrode, first of all, the negative electrode collector 34A made of an electrolytic copper foil (thickness: 10 μm) was prepared, and silicon as a negative electrode active material was deposited on the both surfaces of the negative electrode collector 34A by an electron beam vapor deposition process so as to have a thickness on one surface side of 5 μm, thereby forming plural negative electrode active material particles. There was thus prepared a negative electrode active material layer 34B.

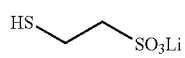

(I)-15

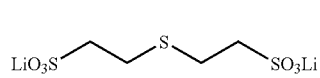

(I)-16

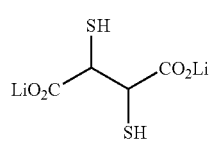

(I)-11

Subsequently, fluoroethylene carbonate and diethyl carbonate were mixed as a solvent, into which was then dissolved lithium hexafluorophosphate (LiPF6) as an electrolyte salt, thereby preparing an electrolytic solution. On that occasion, a composition of the solvent (FEC/DEC) was regulated at 50/50 in terms of a weight ratio, and a concentration of lithium hexafluorophosphate in the electrolytic solution was regulated at 1 mole/kg.

Finally, a secondary battery was assembled by using the electrolytic solution together with the positive electrode 33 and the negative electrode 34.

The positive electrode and the negative electrode were laminated via a separator having an electrolytic solution impregnated therein, and the laminate was interposed between an exterior can and an exterior cap, followed by caulking via a gasket.

With respect to this secondary battery, the thickness of the positive electrode active material layer 33B was regulated such that the charge and discharge capacity of the negative electrode 34 was larger than the charge and discharge capacity of the positive electrode 33, whereby a lithium metal was not deposited on the negative electrode 34 on the way of charge and discharge.

After 100 cycles, the reaction resistance was determined by an alternate current impedance process. The measurement was carried out at a temperature of 23° C.; complex impedance measurement was carried out in a frequency band of from 10-2 to 106 Hz; and a circular arc of the negative electrode resistance component of the determined Cole-Cole plot was approximated to a semicircle, thereby determining the reaction resistance.

TABLE 10

| | Positive electrode | Solvent of electrolytic solution (% by mass) | | | | | | Cycle test Discharge capacity retention rate (%) | Reaction resistance (Ω) |
| --- | --- | --- | --- | --- | --- | --- | --- | --- | --- |
| | | EC | PC | DEC | FEC | DFEC | VC | Additive | | |
| Example 10-1 | Compound (I)-15 | — | — | 50 | 50 | — | — | — | 71 | 9 |
| Example 10-2 | Compound (I)-15 | 10 | 15 | 50 | 10 | 10 | 1 | $LiBF_4$ 0.1 moles/kg + sulfopropionic anhydride 1% | 73 | 11 |
| Example 10-3 | Compound (I)-16 | — | — | 50 | 50 | — | — | — | 72 | 10 |
| Example 10-4 | Compound (I)-11 | — | — | 50 | 50 | — | — | — | 66 | 11 |
| Comparative Example 10-1 | Untreated | — | — | 50 | 50 | — | — | — | 65 | 30 |
| Comparative Example 10-2 | Untreated | 10 | 15 | 50 | 10 | 10 | 1 | $LiBF_4$ 0.1 moles/kg + sulfopropionic anhydride 1% | 71 | 25 |

As shown in Table 10, it was noted that by coating a compound represented by each of Compounds (I)-15, (I)-16 and (I)-11 on the positive electrode, the reaction resistance after the cycles can be suppressed.

While the present application has been described with reference to some embodiments and examples, the present application is never limited to these embodiments and examples, and various changes and modifications can be made therein. For example, the use applications of the positive electrode and the negative electrode according to the embodiments are not always limited to batteries but may be electrochemical devices other than the batteries. Examples of other applications include capacitors.

Also, in the foregoing embodiments and examples, with respect to the kind of the battery, the lithium ion secondary battery in which the capacity of the negative electrode is expressed on the basis of intercalation and deintercalation of lithium has been described. However, the battery according to the embodiments is not always limited thereto. In the case where the negative electrode contains a negative electrode material capable of intercalating and deintercalating lithium, by making the charge capacity of the negative electrode material capable of intercalating and deintercalating lithium smaller than the charge capacity of the positive electrode, the battery according to the embodiments is similarly applicable to a secondary battery in which the capacity of the negative electrode includes a capacity following the intercalation and deintercalation of lithium and a capacity following the deposition and dissolution of lithium and is expressed by the sum of these capacities.

Also, in the foregoing embodiments and examples, with respect to the electrolyte of the battery according to the embodiments, the case of using a liquid electrolyte has been described. However, electrolytes of other kinds may be used. Examples of such other electrolytes include electrolytes in a gel form; mixtures of an ionic conductive inorganic compound (for example, an ionic conductive ceramic, an ionic conductive glass, an ionic conductive crystal, etc.) and an electrolytic solution; mixtures of other inorganic compound and an electrolytic solution; and mixtures of such an inorganic compound and an electrolyte in a gel form.

Also, in the foregoing embodiments and examples, the case where the battery structure has a structure of a coin type has been described as an example. However, the battery according to the embodiments is similarly applicable to the case where the battery structure is other structure such as a rectangular type, a laminate type, a cylinder type and a button type or the case where the battery element has other structure such as a laminate structure.

Also, in the foregoing embodiments and examples, the case of using lithium as the electrode reactant has been described. However, other elements belonging to the Group 1A (for example, sodium, potassium (K), etc.), elements belonging to the Group 2A (for example, magnesium, calcium, etc.) and other light metals (for example, aluminum, etc.) may be used. In these cases, the negative electrode material which has been described in the foregoing embodiments can also be used as the negative electrode active material.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An electrode comprising:
an electrode collector and
an electrode active material layer,
wherein a film containing a salt represented by the following formula (I) is provided on the electrode active material layer:

$$R1A_nM_x \qquad (I)$$

wherein

R1 is an n-valent hydrocarbon group containing at least one structure selected from the group consisting of HS—, —S—, —S—S—, —S—C(=S)—S—, —N—C(=S)—S—, —C(=O)—S—, —O—C(=O)—S—, —S—C(=O)—S— and —S—;

n represents an integer of from 1 to 4;

A represents the anion selected from the group consisting of $CO_2^-$ and $SO_3^-$;

M represents a metal ion selected from the group consisting of an alkali metal ion and an alkaline earth metal ion; and x represents an integer of 1 to 10.

2. The electrode according to claim 1, wherein the film is provided on a first surface of the electrode active material layer opposite a second surface in contact with the electrode collector.

3. A battery comprising:
a positive electrode having a positive electrode collector and a positive electrode active material layer;
a negative electrode having a negative electrode collector and a negative electrode active material layer; and
an electrolytic solution,
wherein a film is provided on at least one of the positive electrode active material layer and the negative electrode active material layer, the film containing a salt represented by the following formula (I):

$$R1A_nM_x \quad (I)$$

wherein

R1 is an n-valent hydrocarbon group containing at least one structure selected from the group consisting of HS—, —S—, —S—S—, —S—C(=S)—S—, —N=C(=S)—S—, —C(=O)—S—, —O—C(=O)—S—, —S—C(=O)—S— and —S—;

n represents an integer of from 1 to 4;

A represents an anion selected from the group consisting of $CO_2^-$ and $SO_3^-$;

M represents a metal ion selected from the group consisting of an alkali metal ion and an alkaline earth metal ion; and x represents an integer of 1 to 10.

4. The battery according to claim 3, wherein the negative electrode active material layer contains a negative electrode active material containing at least one member of a simple substance, an alloy or a compound of silicon and a simple substance, an alloy or a compound of tin.

5. The battery according to claim 3, wherein the negative electrode active material layer has plural negative electrode active material particles and an oxide-containing film for coating the surface of the negative electrode active material particle.

6. The battery according to claim 3, wherein the negative electrode active material particle has a multi-layered structure within the particle thereof, and the negative electrode active material layer has a metal material in a gap between the negative electrode active material particles.

7. The battery according to claim 6, wherein the metal material is at least one member selected from the group consisting of iron, cobalt, nickel, zinc and copper.

8. The battery according to claim 3, wherein the electrolytic solution contains a solvent containing at least one member of a chain carbonic ester containing a halogen, which is represented by the following formula (A), and a cyclic carbonic ester containing a halogen, which is represented by the following formula (B):

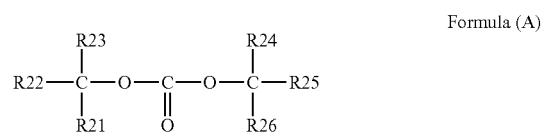

Formula (A)

wherein, R21 to R26 each represents a hydrogen group, a halogen group, an alkyl group or a halogenated alkyl group, provided that at least one of R21 to R26 is a halogen group or a halogenated alkyl group; and

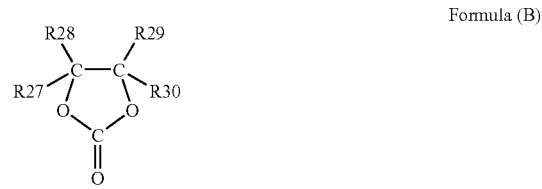

Formula (B)

wherein R27 to R30 each represents a hydrogen group, a halogen group, an alkyl group or a halogenated alkyl group, provided that at least one of R27 to R30 is a halogen group or a halogenated alkyl group.

9. The battery according to claim 8, wherein the chain carbonic ester containing a halogen, which is represented by the formula (A), is at least one member of fluoromethylmethyl carbonate, difluoromethylmethyl carbonate and bis(fluoromethyl) carbonate; and the cyclic carbonic ester containing a halogen, which is represented by the following formula (B), is at least one member of 4-fluoro-1,3-dioxolan-2-one and 4,5-difluoro-1,3-dioxolan-2-one.

* * * * *